United States Patent
Takahashi et al.

(10) Patent No.: US 7,916,948 B2
(45) Date of Patent: Mar. 29, 2011

(54) CHARACTER RECOGNITION DEVICE, MOBILE COMMUNICATION SYSTEM, MOBILE TERMINAL DEVICE, FIXED STATION DEVICE, CHARACTER RECOGNITION METHOD AND CHARACTER RECOGNITION PROGRAM

(75) Inventors: Katsuhiko Takahashi, Tokyo (JP); Daisuke Nishiwaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1116 days.

(21) Appl. No.: 10/585,323

(22) PCT Filed: Dec. 3, 2004

(86) PCT No.: PCT/JP2004/018059
§ 371 (c)(1),
(2), (4) Date: Jul. 6, 2006

(87) PCT Pub. No.: WO2005/066882
PCT Pub. Date: Jul. 21, 2005

(65) Prior Publication Data
US 2007/0189612 A1    Aug. 16, 2007

(30) Foreign Application Priority Data
Jan. 8, 2004   (JP) ................................ 2004-002848

(51) Int. Cl.
*G06K 9/46* (2006.01)
*G06K 9/72* (2006.01)
(52) U.S. Cl. ......................... 382/182; 382/190; 382/229
(58) Field of Classification Search .................. 382/182, 382/181, 190, 310, 177, 187, 113, 195, 294, 382/176, 298, 229, 170, 178, 203, 204; 235/462.25, 235/462.01, 472.01, 454
See application file for complete search history.

(56) References Cited

U.S. PATENT DOCUMENTS

| | | | |
|---|---|---|---|
| 5,978,520 A * | 11/1999 | Maruyama et al. | 382/294 |
| 6,198,846 B1 * | 3/2001 | Nishiwaki | 382/178 |
| 6,335,986 B1 * | 1/2002 | Naoi et al. | 382/190 |
| 6,687,401 B2 * | 2/2004 | Naoi et al. | 382/190 |
| 2005/0221856 A1 * | 10/2005 | Hirano et al. | 455/557 |

FOREIGN PATENT DOCUMENTS

| | | |
|---|---|---|
| JP | 2000-47579 A | 2/2000 |
| JP | 2001-336941 A | 12/2001 |
| JP | 3360030 A | 10/2002 |
| JP | 2003-178067 A | 6/2003 |
| WO | WO 03/050714 A1 | 6/2003 |

OTHER PUBLICATIONS

Japanese Patent Office Action dated Jun. 1, 2010 with English-language Translation.

* cited by examiner

*Primary Examiner* — Sheela C Chawan
(74) *Attorney, Agent, or Firm* — Sughrue Mion, PLLC

(57) ABSTRACT

Words possibly included in a scene image shot by a mobile camera can be efficiently extracted using a word dictionary or a map database. Positional information acquiring means 101 measures a current position of the device to acquire positional information. Directional information acquiring means 102 detects a direction of the device to acquire directional information. Character recognizing means 104 determines a range of shooting of a scene image based on the current positional information and the directional information. The character recognizing means 104 extracts from a map database 103 information such as store names, building names, and place names associated with positions in the shooting range. Then the character recognizing means 104 conducts character recognition using word knowledge such as the extracted store names, building names, and place names.

5 Claims, 11 Drawing Sheets

F I G. 3
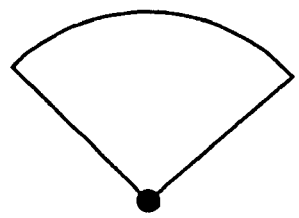
CASE IN WHICH RANGE IS RESTRICTED USING POSITIONAL INFORMATION AND DIRECTIONAL INFORMATION (BLACK POINT INDICATES CURRENT POSITION)
(a)
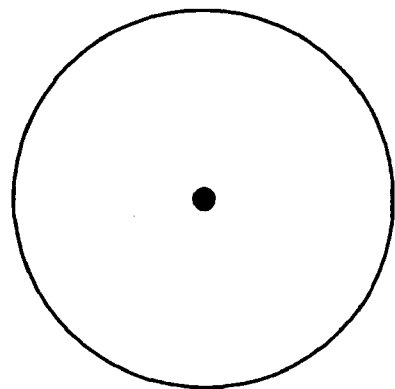
CASE IN WHICH RANGE IS RESTRICTED USING ONLY POSITIONAL INFORMATION
(b)

F I G. 4

| INTERSECTION NAME | ADDRESS | LATITUDE / LONGITUDE | ADJACENT INTERSECTION AND DIRECTION |
|---|---|---|---|
| KINZA 1-CHOME INTERSECTION | KINZA 1-1 | EAST LONGITUDE a1 / NORTH LATITUDE b1 | NORTH : GINZA 8-CHOME, SOUTH : KINZA 2-CHOME |
| KINZA 2-CHOME INTERSECTION | KINZA 2-1 | EAST LONGITUDE a2 / NORTH LATITUDE b2 | NORTH : KINZA 1-CHOME, SOUTH : KINZA 3-CHOME, EAST : OGIKUBO |
| KINZA 3-CHOME INTERSECTION | KINZA 3-1 | EAST LONGITUDE a3 / NORTH LATITUDE b3 | NORTH : KINZA 2-CHOME, SOUTH : KINZA 4-CHOME |
| ---- | ---- | ---- | ---- |

601   602   603   604

(a)

(b)

| BUILDING NAME | ADDRESS | LATITUDE LONGITUDE | HEIGHT |
|---|---|---|---|
| BUILDING A | KINZA 1-1 | e1, f1 | h1 |
| BUILDING B | KINZA 1-2 | e2, f1 | h2 |
| BUILDING C | KINZA 1-3 | e1 f2 | h3 |
| BUILDING D | KINZA 1-4 | e2, f2 | h4 |
| BUILDING E | KINZA 1-5 | e1, f3 | h5 |
| HOUSE F | KINZA 1-6 | e2, f4 | h6 |
| HOUSE G | KINZA 1-7 | e1, f5 | h7 |

| STORE NAME | ADDRESS | BUILDING NAME / FLOOR | TEL. NO. |
|---|---|---|---|
| JEWELLER'S SHOP p | KINZA 1-1 | BUILDING g  1F | 00-0000 |
| ART GALLERY q | KINZA 1-1 | BUILDING g  2F | 00-0001 |
| STATIONERY SHOP | KINZA 1-1 | BUILDING g  3F | 00-0002 |
| ⋮ | ⋮ | ⋮ | ⋮ |

F I G. 10
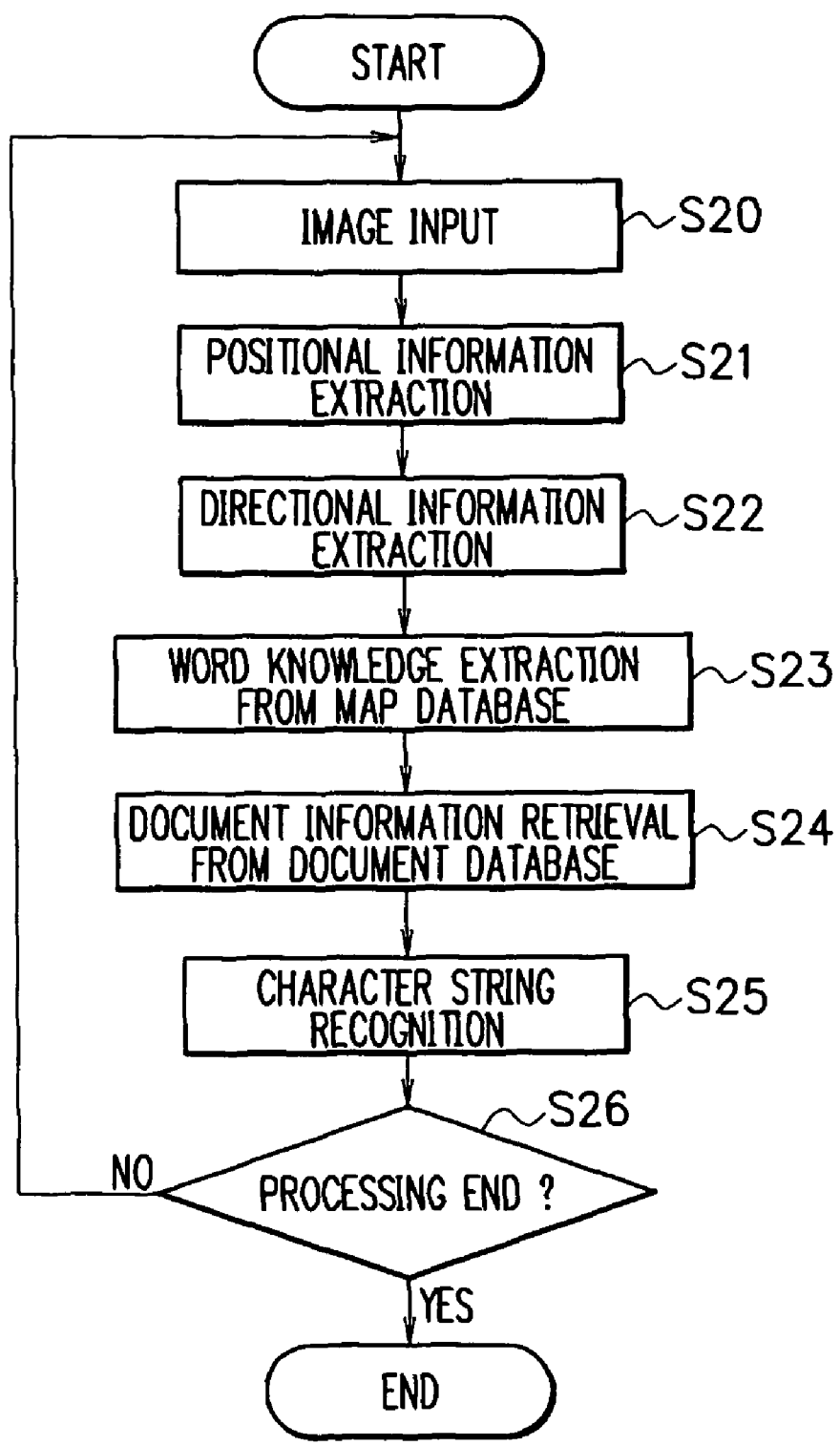

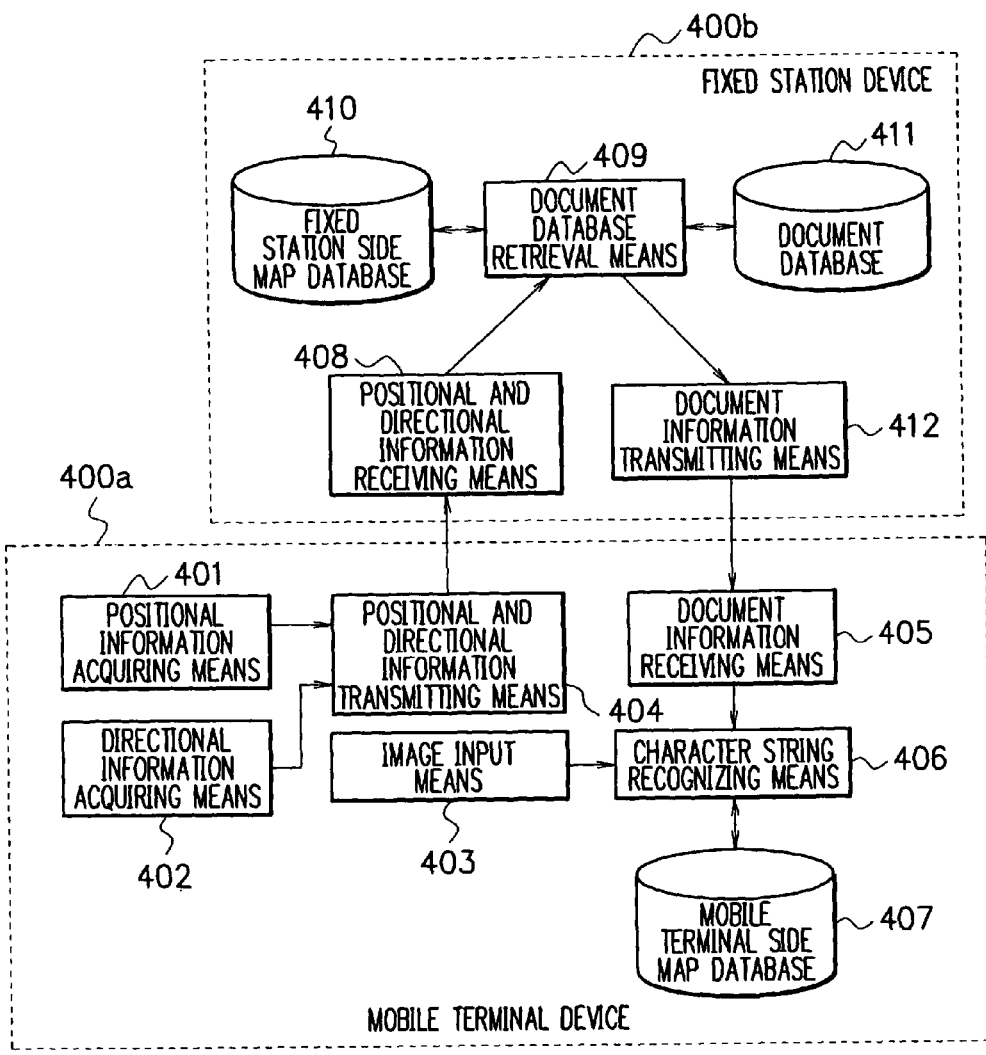
F I G. 15

US 7,916,948 B2

CHARACTER RECOGNITION DEVICE, MOBILE COMMUNICATION SYSTEM, MOBILE TERMINAL DEVICE, FIXED STATION DEVICE, CHARACTER RECOGNITION METHOD AND CHARACTER RECOGNITION PROGRAM

This application claims priority from PCT/JP2004/018059 filed Dec. 3, 2004, and from Japanese Patent Application No. 2004-002848, filed Jan. 8, 2004, which applications are incorporated herein by reference.

TECHNICAL FIELD

The present invention relates to a character recognition device to recognize characters included in an image, a mobile communication system, a mobile terminal device, a fixed station device, a character recognition method, a character recognition program, an information communication program of a mobile terminal device, and an information extraction program of a fixed station device, and in particular, to a character recognition device to recognize characters included in an image, a mobile communication system, a mobile terminal device, a fixed station device, a character recognition method, a character recognition program, an information communication program, and an information extraction program capable of reading character information such as a place name, a road name, a store name, a building name, an advertisement statement, and a person's name described in a road sign, a store's signboard, and a poster in an image of a scene shot by a mobile camera.

RELATED ART

There have been known character recognition devices to recognize character information in an image of a scene shot by a video camera and/or a digital camera. In these character recognition devices, word knowledge (word information) regarding a character string of an object for recognition is generally used in character recognition processing to obtain high recognition accuracy even if there exists variation in lighting and character distortion.

For example, patent document 1 (Japanese Patent No. 3360030 (pages 4 to 6, FIGS. 1 to 4)) describes a character recognition device that extracts character information of a signboard sponsor from a scene image. The character recognition device described in patent document 1 reads a name of the signboard sponsor and a telephone number from the image. The character recognition device counts the number of matching characters in the character string and in the words contained in a telephone directory database or the like to calculate a recognition score. Thereafter, the character recognition device assumes, as a final recognition result, signboard sponsor information for which the highest recognition score is obtained.

Also, patent document 2 (Japanese Patent Application Laid-Open No. 2003-178067 (pages 14 and 15; FIG. 20)) describes an image processing system of portable terminal type to conduct character recognition of an image shot by a portable terminal. In the image processing system of portable terminal type described in patent document 2, positional information obtained from a Global Positioning System (GPS) or the like is related to a word dictionary. Then, a server of the image processing system of portable terminal type conducts character recognition using a word dictionary associated with information of a current position of an device (portable terminal). For example, when a user is in a restaurant, the server selects and uses a dedicated dictionary containing word knowledge such as that of a menu of regional specialties, the word knowledge being likely to be used in a restaurant.

DISCLOSURE OF THE INVENTION

Problem to be Solved by the Invention

In the character recognition device described in document 1 or the image processing system of portable terminal type described in patent document 2, if unnecessarily many word knowledge pieces are employed, there likely occurs that the recognition speed is lowered, and the recognition accuracy is reduced due to the increase in similar words or the like. Therefore, the character recognition speedup and accuracy improvement cannot be fully carried out.

Additionally, according to the character recognition device described in patent document 1, the recognition accuracy is improved by comparison with words contained in a telephone directory database or the like. However, since it is required to check a large volume of word knowledge contained in a telephone directory database or the like, there exists possibility that the speedup and the accuracy improvement cannot be fully achieved in the character recognition processing.

Furthermore, in accordance with the image processing system of portable terminal type described in patent document 2, a dedicated word dictionary only including words that are likely to be included in an input image is employed in the character recognition by using the information of the current position of the device, and hence the character recognition speed can be increased to a certain extent and the character recognition accuracy can be increased.

However, for a scene image (input image), since a camera shoots a scene at a position apart from the camera about several meters to several tens of meters, if the dictionary is selected on the basis of only the positional information from GPS, the character recognition is required to be conducted using the entire words knowledge (dedicated word dictionary) corresponding to a range within a circle having a radius of several tens of meters where the center is the current position. Therefore, the words likely to be contained in the scene image shot by a mobile camera cannot be fully efficiently extracted from a word dictionary or a map database, and hence there still exists room for the character recognition speedup and accuracy improvement.

In addition, according to the image processing system of portable terminal type described in patent document 2, the word knowledge directly associated with the positional information is used for the character recognition. However, word information of other kinds not directly associated with the positional information cannot be utilized for the character recognition.

It is therefore an object of the present invention to provide a character recognition device, a mobile communication system, a mobile terminal device, a fixed station device, a character recognition method, a character recognition program, an information communication program, and an information extraction program capable of efficiently extracting words likely to be included in a scene image shot by a mobile camera, by use of a word dictionary or a map database. Also, it is an object of the present invention to provide a character recognition device, a mobile communication system, a mobile terminal device, a fixed station device, a character recognition method, a character recognition program, an information communication program, and an information extraction program capable of conducting character recognition by use of word information of a kind not directly associated with positional information.

Means for Solving the Problem

A character recognition device in accordance with the present invention comprises imaging means for shooting an image; position measuring means for measuring a shooting position of an image to obtain shooting position information indicating the shooting position; direction detecting means for detecting a shooting direction of an image to obtain shooting direction information indicating the shooting direction; position corresponding information storage means for storing position corresponding information that is words associated with respective positional information indicating positions of respective places; position corresponding information extracting means for determining, based on the shooting position information and the shooting direction information, a range of a shooting object of the imaging means, and extracting from the position corresponding information storage means position corresponding information associated with positions included in the range; and character recognizing means for recognizing, using the position corresponding information extracted by the position corresponding information extracting means, a character or a character string included in the image imaged by the imaging means. In this regard, the position corresponding information is word information, for example, the transportation network information, place name information, building information, and store information stored in the map database 103.

Furthermore, the character recognition device may comprise non-corresponding-to-position information storage means for storing therein non-corresponding-to-position information that is words not associated with positional information, and non-corresponding-to-position information extracting means for extracting non-corresponding-to-position information from the non-corresponding-to-position information storage means according to the position corresponding information extracted by the position corresponding information extracting means, wherein the character recognizing means recognizes a character or a character string included in the image using the position corresponding information extracted by the position corresponding information extracting means and the non-corresponding-to-position information extracted by the non-corresponding-to-position information extracting means. In this structure, since non-geographical non-corresponding-to-position information related to words extracted from the position corresponding information storage means can be read to be used for character recognition, recognition accuracy can be improved for character strings or the like that cannot be directly associated with positional information such as a person's name, an item name, or a date.

Moreover, it may be possible for the non-corresponding-to-position information storage means to store, as non-corresponding-to-position information, a set of words that are not associated with the positional information and that include at least one word equal to position corresponding information; and the non-corresponding-to-position information extracting means extracts non-corresponding-to-position information from the non-corresponding-to-position information storage means using as a key the position corresponding information extracted by the position corresponding information extracting means. In this configuration, words included in non-corresponding-to-position information can be easily extracted to be used for the character recognition processing.

Also, the mobile communication system in accordance with the present invention may be a mobile communication system in which a mobile terminal device and a fixed station device communicate via a wireless transmission path with each other, wherein the mobile terminal device comprises imaging means for shooting an image; position measuring means for measuring a shooting position of an image to obtain shooting position information indicating the shooting position; direction detecting means for detecting a shooting direction of an image to obtain shooting direction information indicating the shooting direction; and information transmitting means on mobile terminal side for transmitting the shooting position information, the shooting direction information, and an image imaged by the imaging means via a communication network to the fixed station device; and the fixed station device comprises position corresponding information storage means for storing position corresponding information that is words associated with respective positional information indicating positions of respective places; position corresponding information extracting means for determining, based on the shooting position information and the shooting direction information that are received from the information transmitting means on mobile terminal side, a range of a shooting object of the imaging means, and extracting from the position corresponding information storage means position corresponding information associated with positions included in the range; character recognizing means for recognizing, using the position corresponding information extracted by the position corresponding information extracting means, a character or a character string included in the image which are received from the information transmitting means on mobile terminal side; and information transmitting means on fixed station side for transmitting information of a character or a character string recognized by the character recognizing means via a communication network to the mobile terminal device. In such structure, since the mobile terminal device need not include the position corresponding information storage means and the character recognizing means, the configuration of the mobile terminal device can be simplified.

Furthermore, it is possible for the fixed station device to comprise non-corresponding-to-position information storage means for storing non-corresponding-to-position information that is words not associated with positional information, and non-corresponding-to-position information extracting means for extracting non-corresponding-to-position information from the non-corresponding-to-position information storage means according to the position corresponding information extracted by the position corresponding information extracting means, wherein the character recognizing means recognizes a character or a character string included in the image using the position corresponding information extracted by the position corresponding information extracting means and the non-corresponding-to-position information extracted by the non-corresponding-to-position information extracting means. In such configuration, the configuration of the mobile terminal device can be simplified and, character recognition accuracy can be increased for a character string or the like not directly related to positional information.

Furthermore, the mobile terminal device may comprise information receiving means on mobile terminal side for receiving information of a character or a character string recognized by the character recognizing means via a communication network from the information transmitting means on fixed station side, and output means for outputting information of the character or the character string. In such structure, the result information of the character recognition can be supplied to the user of the mobile terminal by displaying the information on a display module and/or by producing sound and voice. In this connection, to output information of a character or a character string is to display the information of a character or a character string on a display module or to output the information to a sound and voice output module.

Also, the mobile communication system may be a mobile communication system in which a mobile terminal device and a fixed station device communicate via a wireless transmission path with each other, wherein the mobile terminal device comprises imaging means for shooting an image, position measuring means for measuring a shooting position of an image to obtain shooting position information indicating the shooting position, direction detecting means for detecting a shooting direction of an image to obtain shooting direction information indicating the shooting direction, information transmitting means on mobile terminal side for transmitting the shooting position information and the shooting direction information via a communication network to the fixed station device, and character recognizing means for recognizing a character or a character string included in the image imaged by the imaging means; and the fixed station device comprises position corresponding information storage means on fixed station side for storing position corresponding information that is words associated with respective positional information indicating positions of respective places, position corresponding information extracting means on fixed station side for determining, according to the shooting position information and the shooting direction information that are received from the information transmitting means on mobile terminal side, a range of a shooting object of the imaging means, and extracting from the position corresponding information storage means on fixed station side position corresponding information associated with positions included in the range; non-corresponding-to-position information storage means for storing non-corresponding-to-position information that is words not associated with positional information, non-corresponding-to-position information extracting means for extracting non-corresponding-to-position information from the non-corresponding-to-position information storage means according to the position corresponding information extracted by the position corresponding information extracting means on fixed station side, and information transmitting means on fixed station side for transmitting the non-corresponding-to-position information extracted by the non-corresponding-to-position information extracting means via a communication network to the mobile terminal device, wherein the character recognizing means recognizes a character or a character string included in the image using the non-corresponding-to-position information received from the information transmitting means on fixed station side. In such configuration, since the retrieval processing of the non-corresponding-to-position information is executed in the fixed station, the processing load on the mobile terminal device is mitigated and the mobile terminal device need not have high computation performance. Additionally, since the database storing the non-corresponding-to-position information is controlled on the fixed station side in a unified manner, maintenance is facilitated and maintainability can be improved.

Moreover, the mobile terminal device may comprise position corresponding information storage means on mobile terminal side for storing therein position corresponding information which is words associated with respective positional information indicating positions of respective places and position corresponding information extracting means on mobile terminal side for determining, based on the shooting position information and the shooting direction information, a range of a shooting object of the imaging means, and extracting from the position corresponding information storage means on mobile terminal side position corresponding information associated with positions included in the range, wherein the character recognizing means recognizes a character or a character string included in the image using the non-corresponding-to-position information received from the information transmitting means on fixed station side and the position corresponding information extracted by the position corresponding information extracting means on mobile terminal side. In such structure, by transmitting the non-corresponding-to-position information, the volume of data transmitted from the fixed station device to the mobile terminal device can be reduced.

Also, it is possible for the information transmitting means on fixed station side to transmit the non-corresponding-to-position information extracted by the non-corresponding-to-position information extracting means and the position corresponding information extracted by the position corresponding information extracting means on fixed station side via a communication network to the mobile terminal device and the character recognizing means recognizes a character or a character string included in the image using the non-corresponding-to-position information and the position corresponding information that are received from the information transmitting means on fixed station side. In such structure, compared with a situation in which only the non-corresponding-to-position information is transmitted, the processing load on the mobile terminal device can be further mitigated and the mobile terminal device need no have high computation performance.

Moreover, it is possible for the non-corresponding-to-position information storage means to store non-corresponding-to-position information that is a set of words not associated with positional information and includes at least one word equal to position corresponding information, and the non-corresponding-to-position information extracting means extracts non-corresponding-to-position information from the non-corresponding-to-position information storage means using as a key the position corresponding information extracted by the position corresponding information extracting means on fixed station side. In such configuration, words included in the non-corresponding-to-position information can be easily extracted to be used for the character recognition processing.

The mobile terminal device in accordance with the present invention is a mobile terminal device for communicating information with a fixed station device that executes character recognition processing to recognize a character or a character string included in an image, characterized by comprising imaging means for imaging an image, position measuring means for measuring a shooting position of an image to obtain shooting position information indicating the shooting position, direction detecting means for detecting a shooting direction of an image to obtain shooting direction information indicating the shooting direction, information transmitting means on mobile terminal side for transmitting the shooting position information, the shooting direction information, and an image imaged by the imaging means via a communication network to the fixed station device, and information receiving means on mobile terminal side for receiving from the fixed station device information of a character or a character string obtained by the fixed station device through the character recognition processing for the image using the shooting position information and the shooting direction information.

According to such structure, since the mobile terminal device need not include the position corresponding information storage means and the character recognizing means, the configuration of the mobile terminal device can be simplified.

The fixed station device in accordance with the present invention is a fixed station device for communicating information with a mobile terminal device, comprising information receiving means on fixed station side for receiving from the mobile terminal device an image shot by the mobile terminal device, the shooting position information indicating a shooting position of the image, and the shooting direction information indicating a shooting direction of the image; position corresponding information storage means for storing position corresponding information which is words associated with respective positional information indicating positions of respective places, position corresponding information extracting means for determining, according to the shooting position information and the shooting direction information that are received from the mobile terminal device, a range of an object shot by the mobile terminal device, and extracting from the position corresponding information storage means position corresponding information associated with positions included in the range; character recognizing means for recognizing a character or a character string included in the image received from the mobile terminal device, using the position corresponding information extracted by the position corresponding information extracting means; and information transmitting means on fixed station side for transmitting information of a character or a character string recognized by the character recognizing means via a communication network to the mobile terminal device. In such configuration, since the mobile terminal device need not include the position corresponding information storage means and the character recognizing means, the configuration of the mobile terminal device can be simplified.

Also, the fixed station device may comprise non-corresponding-to-position information storage means for storing therein non-corresponding-to-position information that is words not associated with positional information and non-corresponding-to-position information extracting means for extracting non-corresponding-to-position information from the non-corresponding-to-position information storage means according to the position corresponding information extracted by the position corresponding information extracting means, wherein the character recognizing means recognizes a character or a character string included in the image using the position corresponding information extracted by the position corresponding information extracting means and the non-corresponding-to-position information extracted by the non-corresponding-to-position information extracting means. In such structure, the configuration of the mobile terminal device can be simplified and the character recognition accuracy can be improved for a character string or the like not directly related to positional information.

Moreover, the mobile terminal device may be a mobile terminal device for communicating information with a fixed station device and executing character recognition processing to recognize a character or a character string included in an image, comprising imaging means for shooting an image, position measuring means for measuring a shooting position of an image to obtain shooting position information indicating the shooting position, direction detecting means for detecting a shooting direction of an image to obtain shooting direction information indicating the shooting direction, information transmitting means on mobile terminal side for transmitting the shooting position information and the shooting direction information via a communication network to the fixed station device, information receiving means on mobile terminal side for receiving from the fixed station device non-corresponding-to-position information that is words not associated with respective positional information indicating positions of respective places and that is determined by the fixed station device using the shooting position information and the shooting direction information, and character recognizing means for recognizing a character or a character string included in the image imaged by the imaging means, using the non-corresponding-to-position information received by the information receiving means on mobile terminal side. In such configuration, since the retrieval processing of the non-corresponding-to-position information is executed in the fixed station, the processing load on the mobile terminal device is mitigated and the mobile terminal device need not have high computation performance. Additionally, since the database storing the non-corresponding-to-position information is controlled on the fixed station side in a unified manner, maintenance is facilitated and maintainability can be improved.

Furthermore, the mobile terminal device may comprise position corresponding information storage means on mobile terminal side for storing position corresponding information that is words associated with respective positional information indicating positions of respective places and position corresponding information extracting means on mobile terminal side for determining, according to the shooting position information and the shooting direction information, a range of a shooting object of the imaging means, and extracting from the position corresponding information storage means on mobile terminal side position corresponding information associated with positions included in the range, wherein the character recognizing means recognizes a character or a character string included in the image using the non-corresponding-to-position information received by the information receiving means on mobile terminal side and the position corresponding information extracted by the position corresponding information extracting means on mobile terminal side. In such structure, by transmitting the non-corresponding-to-position information, the volume of data transmitted from the fixed station device to the mobile terminal device can be reduced.

Also, a fixed station device for communicating information with a mobile terminal device that executes character recognition processing to recognize a character or a character string included in an image comprises information receiving means on fixed station side for receiving from the mobile terminal device the shooting position information of an image that is shot by the mobile terminal device and that indicates a shooting position of the image and the shooting direction information indicating a shooting direction of the image, position corresponding information storage means on fixed station side for storing position corresponding information that is words associated with respective positional information indicating positions of respective places, position corresponding information extracting means on fixed station side for determining, based on the shooting position information and the shooting direction information that are received by the information receiving means on fixed station side, a range of an object shot by the mobile terminal device, and extracting from the position corresponding information storage means on fixed station side position corresponding information associated with positions included in the range; non-corresponding-to-position information storage means for storing non-corresponding-to-position information that is words not associated with positional information, non-corresponding-to-position information extracting means for extracting non-corresponding-to-position information from the non-corresponding-to-position information storage means according to the position corresponding information extracted by the position corresponding information extracting means on fixed station side, and information transmitting means on fixed station side for transmitting the non-corresponding-to-position information extracted by the non-corresponding-to-position information extracting means via a communication network to the mobile terminal device. According to such configuration, since the retrieval processing of the non-corresponding-to-position information is executed in the fixed station, the processing load on the mobile terminal device is mitigated and the mobile terminal device need no have high computation performance. Additionally, since the database storing the non-corresponding-to-position information is controlled on the fixed station side in a unified manner, maintenance is facilitated and maintainability can be improved.

Moreover, the information transmitting means on fixed station side may transmit the non-corresponding-to-position information extracted by the non-corresponding-to-position information extracting means and the position corresponding information extracted by the position corresponding information extracting means on fixed station side. According to such structure, compared with a situation in which only the non-corresponding-to-position information is transmitted, the processing load on the mobile terminal device can be further mitigated and the mobile terminal device need not have high computation performance.

A character recognition method in accordance with the present invention is characterized in that imaging means shoots an image, position measuring means measures a shooting position of an image to obtain shooting position information indicating the shooting position, direction detecting means detects a shooting direction of an image to obtain shooting direction information indicating the shooting direction, position corresponding information extracting means determines, based on the shooting position information and the shooting direction information, a range of a shooting object of the imaging means; the position corresponding information extracting means extracts, from the position corresponding information storage means storing therein position corresponding information that is words associated with respective positional information indicating positions of respective places, position corresponding information associated with positions included in the range; and character recognizing means recognizes, using the position corresponding information extracted by the position corresponding information extracting means, a character or a character string included in the image imaged by the imaging means.

Also, in the character recognition method non-corresponding-to-position information extracting means may extract, from non-corresponding-to-position information storage means storing therein non-corresponding-to-position information that is words not associated with positional information, non-corresponding-to-position information according to the position corresponding information extracted by the position corresponding information extracting means, and the character recognizing means recognizes a character or a character string included in the image using the position corresponding information extracted by the position corresponding information extracting means and the non-corresponding-to-position information extracted by the non-corresponding-to-position information extracting means. In such structure, since non-geographical non-corresponding-to-position information related to words extracted from the position corresponding information storage means can be read to be used for character recognition, recognition accuracy can be improved for character strings or the like that cannot be directly associated with positional information such as a person's name, an item name, or a date.

Furthermore, the character recognition method may be a character recognition method of recognizing a character or a character string included in an image, for use in a mobile communication system in which a mobile terminal device and a fixed station device communicate via a wireless transmission path with each other, wherein the mobile terminal device shoots an image, the mobile terminal device measures a shooting position of an image to obtain shooting position information indicating the shooting position, the mobile terminal device detects a shooting direction of an image to obtain shooting direction information indicating the shooting direction, the mobile terminal device transmits the shooting position information, the shooting direction information, and an image imaged by the imaging means via a communication network to the fixed station device; the fixed station device determines, based on the shooting position information and the shooting direction information that are received from the mobile terminal device, a range of a shooting object of the mobile terminal device; the fixed station device extracts, from position corresponding information storage means storing position corresponding information that is words associated with respective positional information indicating positions of respective places, position corresponding information associated with positions included in the range; the fixed station device recognizes, using the extracted position corresponding information, a character or a character string included in the image received from the mobile terminal device; and the fixed station device transmits information of a character or a character string via a communication network to the mobile terminal device. In such structure, since the mobile terminal device need not include the position corresponding information storage means and the character recognizing means, the configuration of the mobile terminal device can be simplified.

Furthermore, in the character recognition method the mobile terminal device may receive information of a character or a character string recognized by the fixed station device, via a communication network from the fixed station device; and the mobile terminal device outputs information of the character or the character string. In such structure, the result information of the character recognition can be supplied to the user of the mobile terminal by displaying the information on a display module and/or by producing sound and voice.

Also, the character recognition method may be a character recognition method of recognizing a character or a character string included in an image, for use in a mobile communication system in which a mobile terminal device and a fixed station device communicate via a wireless transmission path with each other, wherein the mobile terminal device images an image, the mobile terminal device measures a shooting position of an image to obtain shooting position information indicating the shooting position, the mobile terminal device detects a shooting direction of an image to obtain shooting direction information indicating the shooting direction, the mobile terminal device transmits the shooting position information and the shooting direction information via a communication network to the fixed station device, the fixed station device determines, based on the shooting position information and the shooting direction information that are received from the mobile terminal device, a range of a shooting object of the mobile terminal device; the fixed station device extracts, from position corresponding information storage means on fixed station side storing position corresponding information that is words associated with respective positional information indicating positions of respective places, position corresponding information associated with positions included in the range; the fixed station device extracts, from non-corresponding-to-position information storage means storing non-corresponding-to-position information that is words not associated with positional information, non-corresponding-to-position information according to the position corresponding information extracted from the position corresponding information storage means on fixed station side; the fixed station device transmits the extracted non-corresponding-to-position information via a wireless transmission network to the mobile terminal device; and the mobile station device recognizes a character or a character string included in the image shot by the mobile terminal device, using the non-corresponding-to-position information received from the fixed station device. In such configuration, since the retrieval processing of the non-corresponding-to-position information is executed in the fixed station, the processing load on the mobile terminal device is mitigated and the mobile terminal device need not have high computation performance. Additionally, since the database storing the non-corresponding-to-position information is controlled on the fixed station side in a unified manner, maintenance is facilitated and maintainability can be improved.

A character recognition program in accordance with the present invention causes a computer to execute processing for determining, based on shooting position information indicating a shooting position of an image and shooting direction information indicating a shooting direction of an image, a range of a shooting object; processing for extracting, from position corresponding information storage means storing position corresponding information that is words associated with respective positional information indicating positions of respective places, position corresponding information associated with positions included in the range; and character recognition processing for recognizing, using the extracted position corresponding information, a character or a character string included in the image.

Also, the character recognition program may make a computer execute processing for extracting, from non-corresponding-to-position information storage means storing non-corresponding-to-position information which is words not associated with positional information, non-corresponding-to-position information according to the position corresponding information extracted from the position corresponding information storage means; and processing for recognizing a character or a character string included in the image using the position corresponding information extracted from the position corresponding information storage means and the non-corresponding-to-position information extracted from the non-corresponding-to-position information storage means. In such structure, since non-geographical non-corresponding-to-position information related to words extracted from the position corresponding information storage means can be read to be used for character recognition, recognition accuracy can be increased for character strings or the like which cannot be directly associated with positional information such as a person's name, an item name, or a date.

The information communication program in accordance with the present invention is an information communication program in a mobile terminal device communicating information with a fixed station device that executes character recognition processing to recognize a character or a character string included in an image, the program causing a computer to execute processing for transmitting shooting position information indicating a shooting position of an image, shooting direction information indicating a shooting direction of an image, and an image via a wireless transmission network to the fixed station device; and processing for receiving from the fixed station device information of a character or a character string obtained by the fixed station device through the character recognition processing for the image using the shooting position information and the shooting direction information. According to such structure, since the mobile terminal device need not include the position corresponding information storage means and the character recognizing means, the configuration of the mobile terminal device can be simplified.

Also, the character recognition program may be a character recognition program in a fixed station device for communicating information with a mobile terminal device, the program causing a computer to execute processing for receiving from the mobile terminal device the image shot by the mobile terminal device, the shooting position information indicating a shooting position of the image, and the shooting direction information indicating a shooting direction of the image; processing for determining, according to the shooting position information and the shooting direction information which are received from the mobile terminal device which are received from the mobile terminal device, a range of an object shot by the mobile terminal device; processing for extracting, from position corresponding information storage means storing position corresponding information which is words associated with respective positional information indicating positions of respective places, position corresponding information associated with positions included in the range; processing for recognizing a character or a character string included in the image received from the mobile terminal device, using the extracted position corresponding information; and processing for transmitting information of a character or a character string via a communication network to the mobile terminal device. According to such structure, since the mobile terminal device need not include the position corresponding information storage means and the character recognizing means, the configuration of the mobile terminal device can be simplified.

Furthermore, the character recognition program may be a character recognition program in a mobile terminal device for communicating information with a fixed station device and executing character recognition processing to recognize a character or a character string included in an image, the program causing a computer to execute processing for transmitting shooting position information indicating a shooting position of an image and shooting direction information indicating a shooting direction of an image, via a communication network to the fixed station device; processing for receiving from the fixed station device non-corresponding-to-position information which is words not associated with respective positional information indicating positions of respective places and which is determined by the fixed station device using the shooting position information and the shooting direction information; and processing for recognizing a character or a character string included in the image shot by the mobile terminal device, using the non-corresponding-to-position information received from the fixed station device. According to such configuration, since the retrieval processing of the non-corresponding-to-position information is executed in the fixed station, the processing load on the mobile terminal device is mitigated and the mobile terminal device need not have high computation performance. Additionally, since the database storing the non-corresponding-to-position information is controlled on the fixed station side in a unified manner, maintenance is facilitated and maintainability can be improved.

The information extraction program in accordance with the present invention is an information extraction program in a fixed station device for communicating information with a mobile terminal device that executes character recognition processing to recognize a character or a character string included in an image, causing a computer to execute processing for receiving from the mobile terminal device shooting position information indicating a shooting position of an image shot by the mobile terminal device and shooting direction information indicating a shooting direction of the image; processing for determining, according to the shooting position information and the shooting direction information which are received from the mobile terminal device, a range of an object shot by the mobile terminal device; processing for extracting, from position corresponding information storage means on fixed station side storing position corresponding information which is words associated with respective positional information indicating positions of respective places, position corresponding information associated with positions included in the range; processing for extracting, from non-corresponding-to-position information storage means storing non-corresponding-to-position information which is words not associated with positional information, non-corresponding-to-position information according to the position corresponding information extracted from the position corresponding information storage means on fixed station side; and processing for transmitting the extracted non-corresponding-to-position information via a communication network to the mobile terminal device. In such configuration, since the retrieval processing of the non-corresponding-to-position information is executed in the fixed station, the processing load on the mobile terminal device is mitigated and the mobile terminal device need not have high computation performance. Additionally, since the database storing the non-corresponding-to-position information is controlled on the fixed station side in a unified manner, maintenance is facilitated and maintainability can be improved.

Advantages of the Invention

In accordance with the present invention, by using both of the shooting position information and the shooting direction information, only the word knowledge likely to be contained in the scene image with a high probability is extracted from the position corresponding information storage means (such as a word dictionary and a map database), and hence the word knowledge to be used for the character recognition can be efficiently limited, compared to a case where the word knowledge is limited using only the positional information. Therefore, the character string recognition speedup and the recognition accuracy improvement can be achieved. Consequently, words possibly contained in the scene image shot by a mobile camera can be efficiently extracted by using a word dictionary or a map database.

BEST MODE FOR CARRYING OUT THE INVENTION

Embodiment 1

Next, description will be given of a first embodiment of the present invention by referring to drawings. FIG. 1 is a block diagram showing an example of structure of a character recognition device in accordance with the present invention. As shown in FIG. 1, the character recognition device includes positional information acquiring means 101, directional information acquiring means 102, a map database 103, character string recognizing means 104, and image input means 106.

The image input means 106 is implemented by, for example, a mobile video camera. The image input means 106 shoots a scene image (input image) and delivers image data to the character string recognizing means 104.

The positional information acquiring means 101 is implemented by, for example, a GPS receiver. The means 101 measures a position of a device (e.g., the image input means 106) to obtain positional information (latitude and longitude) and feeds the information to the character string recognizing means 104. That is, the means 101 outputs shooting position information indicating a shooting position of the scene image.

The directional information acquiring means 102 is implemented by, for example, a gyroscope. The means 102 detects a direction of a device (e.g., the image input means 106) to obtain information of a direction of the device (directional information such as east, west, south, or north) and feeds the information to the character string recognizing means 104. That is, the means 102 outputs shooting direction information indicating a shooting direction of the scene image.

The map database 103 is implemented by, for example, a storage device such as a magnetic disk device (not shown). The map database 103 stores therein transportation network information regarding transport networks such as roads and railroads, place name information indicating place names and positions of regions, building information such as names, structures, and addresses of buildings, and store information indicating names, telephone numbers, and addresses of stores. Additionally, the map database 103 stores word information such as traffic network information, place information, building information, and store information in association with positional information (information such as latitude and longitude).

The character string recognizing means 104 is implemented by, for example, a computer (not shown) operating according to a character recognition program, which will be described later. The means 104 identifies, according to the current position information and the directional information of the character recognition device, a range (shooting range) of a place shot in the scene image. The range of the place shot in the scene image determined by the character string recognizing device is simply described as a particular range hereinbelow.

The character string recognizing means 104 extracts information such as a store name, a building name, and a place name associated with locations in the particular range, from the map database. The means 104 conducts character recognition using the extracted information such as a store name, a building name, and a place name. Also, the means 104 conducts character recognition using also information of names of lands, intersections, and stations connected via a transportation network and a railroad network shot in the scene image. Incidentally, in the embodiment, word information such as a place name and a building name that the means 104 uses for the character recognition is described as word knowledge.

The imaging means is realized by the image input means 106. The position measuring means is implemented by the positional information acquiring means 101. The direction detecting means is realized by the directional information acquiring means 102. The position corresponding information storage means is implemented by the map database 103. The position corresponding information extracting means and the character recognizing means are realized by the character string recognizing means 104.

Furthermore, in the embodiment, a storage device (not shown) of the computer realizing the character string recognizing means 104 has stored various programs to execute the character recognition processing. For example, the storage device of the computer has stored a character recognition program to cause the computer to execute processing to determine a range of the shooting object according to the shooting position information indicating an image shooting position and the shooting direction information indicating an image shooting direction, processing to extract position corresponding information associated with positions contained in the range from the position corresponding information storage means storing therein position corresponding information items that are words associated with respective positional information indicating positions of respective places, and character recognition processing to recognize characters or character strings contained in an image by use of the extracted position corresponding information.

Next, operation will be described. FIG. 2 is a flowchart showing an example of the character recognition processing which the character recognition device executes. The image input means 106 shoots a scene image to deliver image data to the character string recognizing means 104 (step S10). The positional information acquiring means 101 measures the location of the device to acquire the current position information to output the information to the character string recognizing means 104 (step S11). The directional information acquiring means 102 detects the direction of the device to acquire directional information and delivers the information to the means 104 (step S12).

The character string recognizing means 104 refers to the map database 103 based on the current position information and the directional information to restrict words to be used in the recognition processing and extracts word knowledge from the map database 103. As a result, word knowledge such as place names and building names are extracted. Thereafter, the means 104 reads character strings from the scene image by using the extracted word knowledge to thereby conduct the character recognition (step S13).

When the character recognition is finished, the character string recognizing means 104 determines whether an indication of the processing end is inputted by a user or the like (step S14). For example, the means 104 displays, after the character recognition is finished, the result of the character recognition on a display module (not shown) or the like and displays an end/continuance indication input screen of character recognition processing. And the user inputs, to terminate the character recognition processing, an indication of the processing end from an input module (not shown) or the like. Incidentally, the means 104 may supply the character recognition result information through voice and sound by outputting the information to a voice and sound output module (not shown) or the like, not by displaying the information.

If it is determined that a processing end indication is inputted, the character recognition device terminates the character recognition processing. If it is not determined that a processing end indication is inputted, the character recognition device returns again to step S10 to repeatedly execute the processing of steps S10 to S14.

As above, according to the embodiment, the character recognition device extracts word knowledge from the map database 103 based on the positional information and the directional information acquired by the positional information acquiring means 101 and the directional information acquiring means 102. Thereafter, the character recognition device executes the character recognition processing by use of information such as region names, building names, store names, store addresses, and store telephone numbers associated with a region in the scene image and information such as place names of regions connected via a transportation network to the associated region.

By use of both of the positional information and the directional information, only the word knowledge such as place names, road names, building names, and store names that will be contained in the scene image with a high probability are extracted from the map database 103, and hence the word knowledge to be used for the knowledge recognition can be efficiently restricted in comparison with the case where word knowledge is extracted using only the positional information. Consequently, the speedup of recognition and the recognition accuracy improvement can be achieved in the character string recognition.

FIG. 3 is an explanatory diagram showing an example of a particular range that the character recognition device determines. FIG. 3(a) is an explanatory diagram showing an example of a particular range that the character recognition device determines in accordance with the present invention. Also, FIG. 3(b) is an explanatory diagram showing an example of a particular range which the conventional character recognition device (e.g., a server of the system described in patent document 2) determines. The region in a scene image is in general an area of a sector shape on a plane. When word knowledge is extracted from a map database based only on positional information such as the GPS information, the character recognition must be conducted using all words related to the circular range whose center is the current position of the device as shown in FIG. 3(b).

In accordance with the embodiment, as shown in FIG. 3(a), by using the directional information in addition to the positional information, it is possible to extract only the word knowledge related to the sector range shot in the scene image. Therefore, by use of the directional information, the character recognition can be conducted without using information related to regions outside the scene image range, and hence the words can be efficiently restricted as compared with the conventional case where only the positional information is used. Therefore, the speedup of the recognition speed and the improvement of recognition accuracy can be achieved when compared with the conventional case where only the positional information is used.

Moreover, with the transportation network information stored in the map database 103, place names of places outside the sector range shown in FIG. 3(a) such as place names of adjacent zones that can be described in directional signs can also be utilized in the character recognition processing.

Next, description will be given of a concrete example of the embodiment. The description here is given by use of an example of a case where the character recognition device includes a GPS receiver as the positional information acquiring means 101, a gyroscope as the directional information acquiring means 102, a magnetic disk device as the map database 103, a computer as the character string recognizing means 104, and a mobile video camera as the image input means 106.

The video camera shoots a scene image to output image data to the computer. The GPS receiver measures the current position of the device according to a received GPS signal to acquire latitude and longitude (positional information) and delivers the information to the computer.

The gyroscope detects a direction of the device (the video camera in this example) to acquire directional information and delivers the information to the computer. For example, assume that the direction of the directional information is expressed by a numeric value, and the north, the east, the south, and the west are represented as "0", "90", "180", and "270". In this case, if the device faces southwest, the gyroscope outputs a value "255" as the directional information. In this regard, the representing method of the directional information is not limited to that of this example, and it is also possible to use any other representing method capable of uniquely determining the direction.

The map database 103 implemented by the magnetic disk device stores therein transportation network information, place name information, building information, and store information. FIGS. 4 to 7 are explanatory diagrams showing examples of the contents of the transportation network information, the place name information, the building information, and the store information.

FIG. 4 is an explanatory diagram showing an example of the transportation network information regarding roads. As shown in FIG. 4, the map database 103 stores therein, for example, information such as intersection names 601, intersection addresses (addresses 602 and latitude/longitude 603), adjacent intersection names/directions 604 as the transportation network information regarding roads. Furthermore, the map database 103 may store therein, for example, information such as a road name connecting intersections as the transportation network information.

FIG. 5 is an explanatory diagram showing an example of the place name information. FIG. 5(a) is an explanatory diagram showing an example of a place name table 706 the map database 103 stores as the place name information. FIG. 5(b) is an explanatory diagram showing an example of a two-dimensional map 707 the map database 103 stores as the place name information. As shown in FIG. 5(b), the map database 103 stores, as the place name information, the two-dimensional map 707 labeled (C1 to C3) for regions 703 to 705. Furthermore, the map database 103 stores the place name table 706 indicating a correspondence between the place name 701 and the map label value 702 as shown in FIG. 5(a). Also, when the x and y coordinate values of the two-dimensional map 707 are associated with latitude/longitude, it is possible to know the name of the current position from the information of latitude/longitude.

FIG. 6 is an explanatory diagram showing an example of the building information. The map database 103 stores, for example, information regarding various building attributes such as a building name 801, an address 802, latitude/longitude 803, and height 804 of each building as the building information.

FIG. 7 is an explanatory diagram showing an example of the store information. The map database 103 stores, for example, information such as a store name 901, an address 902, a building name/floor 903, and a telephone number 904 as the store information.

Next, description will be given of a method of extracting a store name, a building name, and a place name when the current positional information and the current directional information to be used in the recognition are inputted respectively from the GPS receiver and the gyroscope to the computer.

First, by referring to drawings, description will be given of a method of extracting a place name. FIG. 8 is an explanatory diagram displaying the current position, the current direction, and the shooting range of the character recognition device at a certain point of time on a map. In the example, description will be given of a case where the current position is a point 1001, the current direction is "facing north", and an angle of view of a scene image is 90 degrees, and the shooting range is a shaded area 1002. If a store signboard is included in the scene image, an address name of the shaded area 1002 will exist in the store signboard with a high probability. In this situation, the character recognition device refers to the place name information stored in the map database 103 to extract the place name of an area corresponding to the shaded area 1002.

For example, when the point 1001 is a point 708 of FIG. 5(b) and the shaded range 1002 is a shaded range 709 of FIG. 5(b), the character recognition device determines, according to the two-dimensional map 707 shown in FIG. 5(b), that a region shot in the scene image is a range with a label value of "C2". Also, the character recognition device extracts, according to the place name table 706 shown in FIG. 5(a), a place name of "Kinza 2-chome" corresponding to the label value "C2". That is, first, a word of a place name such as "Kinza 2-chome" or "Kinza" is extracted as a word to be used for the character recognition.

Furthermore, a name of a place in the neighborhood may be on a traffic sign. Therefore, the character recognition device refers to the transport network information shown in FIG. 4 to extract a place name of a region that will be reached if the car turns left at the intersection, runs straight through the intersection, or turns right at the intersection. For example, if it is assumed that a point of east longitude "a2"/north latitude "b2" is included in the shooting range of the scene image at a point of time, the character recognition device determines according to the transportation network information shown in FIG. 4 that "Kinza 2-chome intersection" is included in the shooting range. Thereafter, the character recognition device extracts, according to the transportation network information shown in FIG. 4, intersection names of "Kinza 1-chome" and "Kinza 3-chome" existing in the neighborhood, addresses of the intersections, and a place name of an intersection appearing thereafter.

Next, description will be given of a method of extracting a building name, a store name, and a store telephone number by referring to drawings. A building name and a store name may be described on a store signboard or the like. Therefore, the character recognition device extracts information of buildings included in the latitude/longitude of the shaded area 1002 according to the latitude/longitude 803 of the building information shown in FIG. 6. That is, the character recognition device extracts a building name 801 and an address 802 of a building according to the latitude/longitude 803. Also, the device compares the extracted building name 801 with the store information shown in FIG. 7 to extract information of a store name 901 and a telephone number 904 in the building.

The character string recognizing means (a computer in this example) 104 conducts character recognition for the inputted scene image by using the word knowledge such as the place names and the store names extracted in the method described above. The means 104 conducts the character recognition by using, for example, as a character recognition algorithm employing word knowledge, a dynamic planning method or a Hidden Markov Model (HMM) method generally used for mail address recognition.

For example, the character string recognizing means 104 assumes, using the dynamic planning method or the HMM method, that each of the various figures included in the input image as one character and then recognizes a character for each figure. Then the means 104 combines the characters recognized for the respective figures in various ways and compares the combined character string with the word knowledge to thereby conduct the character recognition at a word level.

If the word knowledge is not employed, a word cannot be correctly recognized unless the recognition is correctly conducted for each character. However, by use of the word knowledge, a slight recognition error of each character can be corrected, and hence the character recognition accuracy can be improved.

Next, description will be given of an advantage of the present invention by referring to drawings. In the present invention, as shown in FIG. 8, the character recognition processing can be achieved without using the word knowledge such as place names, building names, and store names belonging to a region outside the shooting range, the shaded area 1002. For example, as shown in FIG. 8, a building 1008 exists relatively near the current position 1001 but in the reverse direction of the shooting, and hence the character recognition device can conduct the character recognition processing by assuming that the word knowledge regarding a building name of the building 1008, store names, store addresses, telephone numbers, and the like in the building is not the processing object.

As above, in accordance with the present invention, the word knowledge required for the processing can be restricted in comparison with the conventional case in which word knowledge is extracted according only to the positional information. As the amount of word knowledge reduces, the character recognition processing can be executed at a higher speed, and hence the present invention can accelerate the recognition processing.

Incidentally, in the description of the concrete example, the image input means 106 is a mobile video camera. However, the means 106 may be any other imaging means. For example, the means 106 may be a portable telephone or a Personal Digital Assistant (PDA) including a camera, the telephone or the PDA being carried about by a user. Also, the means 106 may be a digital camera or a vehicle mounted camera fixed on a mobile vehicle. Additionally, the image shot by the means 106 may be a still image or a moving image.

Embodiment 2

Next, description will be given of a second embodiment of the present invention by referring to drawings. FIG. 9 is a block diagram showing another example of the configuration of the character recognition device. As shown in FIG. 9, the device includes a positional information acquiring means 201, a directional information acquiring means 202, a map database 203, a character string recognizing means 204, a document database 205, and an image input means 206.

In the embodiment, the character recognition device includes, in addition to the constituent components shown in the first embodiment, a document database 205. In the embodiment, the device differs from the first embodiment in that the device conducts the character recognition processing using words included in the information stored in the document database in addition to the map database 203. In this connection, functions and implementing methods of the positional information acquiring means 201, the directional information acquiring means 202, the map database 203, and the image input means 206 are similar to those of the positional information acquiring means 101, the directional information acquiring means 102, the map database 103, and the image input means 106 shown in the first embodiment.

The document database 205 is realized by a storage device, for example, a magnetic disk device (not shown) or the like. The document database 205 stores therein text information not directly associated with the positional information such as latitude/longitude. For example, the document database 205 stores a set of text information items such as "Painter A's private exhibition is held at a special events hall of the 8th floor of department store B from 3rd to 6th October" and "A good seller of bakery C is a cream bun". The text information stored in the document database 205 will be referred to as document information (non-corresponding-to-position information) hereinbelow.

As will be described later, the character recognition device of the embodiment conducts character recognition by using also the word knowledge included in the document information. For example, the device conducts character recognition using also the word knowledge such as "3rd October" and "Painter A" contained in the document information "Painter A's private exhibition is held at a special events hall of the 8th floor of department store B from 3rd to 6th October".

The character string recognizing means 204 is realized, for example, by a computer (not shown) or the like operating according to a character recognition program. The character recognition device 204 determines a range of a place shot in the scene image, according to the current position information and the directional information of the device. The device 204 extracts from the map database 203 information such as store names, building names, and place names associated with locations in the particular range.

Furthermore, the character string recognizing means 204 conducts not only the character recognition using the word knowledge extracted from the map database 203, but extracts from the document database 205 document information related to the word knowledge extracted from the map database 203. Also, the character string recognizing means 204 conducts the character recognition processing also using the document information in addition to the word knowledge extracted from 203.

By extracting the related document information from the document database 205 and by using the information as word knowledge, the character string recognition processing can be conducted by use of the extracted document information. Also, if the extracted document information is not in word format, the character string recognizing means 204 conducts a syntactic analysis to divide the document information into word units, and then the information can be used in the character string recognition processing.

The non-corresponding-to-position information storing means is realized by the document database 205. The non-corresponding-to-position information extracting means is realized by the character string recognizing means 204.

Moreover, in the embodiment, the storage device (not shown) of the computer implementing the character string recognizing means 204 has stored various programs to execute the character recognition processing. For example, the storage device of the computer stores therein a character recognition program to make a computer execute processing for determining, according to shooting position information indicating a shooting position of an image and shooting direction information indicating a shooting direction of an image, a range of an object of imaging; processing for extracting, from position corresponding information storage means storing position corresponding information which is words associated with respective positional information indicating positions of respective places, position corresponding information associated with positions included in the range; processing for extracting, from non-corresponding-to-position information storage means storing therein non-corresponding-to-position information which is words not associated with positional information, non-corresponding-to-position information according to the position corresponding information extracted from the position corresponding information storage means; and processing for recognizing a character or a character string included in the image using the position corresponding information extracted from the position corresponding information storage means and the non-corresponding-to-position information extracted from the non-corresponding-to-position information storage means.

Next, the operation will be described. FIG. 10 is a flowchart showing another example of the processing progress of the character recognition processing executed by the character recognition device. In FIG. 10, the processing from step S20 to step S22 is similar to that from step S10 to step S12 shown in the first embodiment.

The character string recognizing means 204 refers to the map database 203 according to the current positional information and the directional information to extract word knowledge from the map database 203 (step S23). The recognizing means 204 makes a search through the document database 205 using the extracted word knowledge as a key word to extract document information from the database 205 (step S24). Thereafter, by using the word knowledge extracted from the map database 203 and the document information extracted from the document database 205, the recognizing means 204 reads character information from the scene image to thereby conduct the character recognition (step S25).

When the character recognition is finished, the recognizing means 204 determines whether an indication of the processing end is inputted by a user or the like (step S26). If it is determined that the indication of the processing end is inputted, the character recognition device terminates the character recognition processing. If it is not determined that the indication of the processing end is inputted, the character recognition device returns again to the processing of step S20 to repeatedly execute the processing from step S20 to step S26.

In this regard, the character string recognizing means 204 may display, for example, information resultant from the character recognition on a display module (not shown) to thereby supply the information to the user. Also, the recognizing means 204 may deliver, for example, the character recognition result information to a sound and voice output module (not shown) to thereby supply the information to the user.

As above, according to the embodiment, the character recognition device extracts, according to the positional information and the directional information, related document information from the document database 205, the related document information which is not directly associated with the positional information and is related to the word knowledge extracted from the map database 203. Then the character recognition device conducts character recognition using the related document information. Therefore, it is possible for the device to extract, from the document database 205, the non-geographical document information related to the words extracted from the map database 203 and to use the document information for the character recognition, and hence the recognition accuracy can be increased for a character string such as a name of a person, an item name, or a date which cannot be directly associated with the positional information.

Next, description will be given of a concrete example of the embodiment. In this situation, description will be given of an example of a case in which the character recognition device includes a GPS receiver as the positional information acquiring means 201, a gyroscope as the directional information acquiring means 202, a magnetic disk device for maps as the map database 203, a magnetic disk device for documents as the document database 205, a computer as the character string recognizing means 204, and a vehicle mounted camera as the image input means 206, the camera being fixed onto a mobile vehicle.

The GPS receiver and the gyroscope are similar to the concrete example shown in the first embodiment. Also, the magnetic disk device for maps is similar to the magnetic disk device of the concrete example shown in the first embodiment.

The on-vehicle camera shoots a scene and outputs image data to the computer. The magnetic disk device for documents has stored various document information. In this regard, the document information may be data described in a document format or in a description format (e.g., data of a set of words) in which key words are related with each other in a network contour.

The computer refers to, according to the current positional information and the directional information inputted from the GPS receiver and the gyroscope, the magnetic disk devices for maps and documents to read characters from the scene image. Incidentally, the method for the computer to extract word knowledge to be used for character recognition from the magnetic disk device for maps is similar to the concrete example shown in the first embodiment.

Next, by referring to drawings, description will be given of a method for the computer to extract word knowledge to be used for character recognition from the magnetic disk for documents. FIG. 11 is an explanatory diagram showing an example of a hanging screen of a department store shot by a camera mounted on a vehicle that is running through a shopping quarter. As shown in FIG. 11, proper nouns such as "painter A" are described on the hanging screen in this example. In this case, since the word "painter A" is information not directly related to the positional information such as latitude/longitude, the computer (character string recognizing means 204) cannot extract word knowledge regarding "painter A" from the magnetic disk device for maps (map database 203).

In the example, the computer extracts "department store B" shot in the scene image from the magnetic disk device for maps, based on the word knowledge stored in the magnetic disk device for maps (map database 203) and the positional information/directional information. Then the computer retrieves a related document from the document information stored in the magnetic disk device for documents, using "department store B" as a key word (retrieval key).

For example, when the magnetic disk device for documents has stored document information of "Painter A private exhibition is held at a 8th floor special events hall of department store B from 3rd to 6th October", the computer extracts word knowledge such as "3rd October", "6th", "painter A", "private exhibition", "8th floor", and "special events hall" from the document information. The computer then conducts character recognition using the extracted word knowledge. Therefore, the computer can conduct character recognition using the word knowledge "painter A".

That is, in the concrete example, the magnetic disk device for documents has stored, as document information, a set of words not associated with the positional information, the set including at least one word ("department store B" in this example) equal to word knowledge stored in the magnetic disk device for maps. And the computer extracts a set of words such as "painter A" including "department store B" from the magnetic disk device for documents using as a key the word knowledge ("department store B" in the example) extracted from the magnetic disk device for maps.

Incidentally, in this example, description has been given of a case where the document information stored in the magnetic disk device for documents is described in a document format and the word knowledge is extracted from the document information obtained through key word retrieval. However, the document information is not restricted by the document format shown in the example. For example, the document information stored in the magnetic disk device for documents may be data described as a set of word knowledge such as "3rd October", "6th October", "painter A", "private exhibition", "department store B", "8th floor", and "special events hall".

Additionally, if the document information stored in the magnetic disk device for documents is advertisement information with a limited period of time and news items, it is also possible to update the document information according to necessity. For example, the user of the character recognition device may update, using software to update a document database, the document information stored in the magnetic disk device for documents. Also, for example, it is possible to update the document information by receiving text information via the Internet.

Embodiment 3

Next, description will be given of a third embodiment of the present invention by referring to drawings. FIG. 12 is a block diagram showing an example of the configuration of a mobile communication system in which a mobile terminal device and an in-fixed-station device conduct communication with each other via a wireless transmission path. As shown in FIG. 12, the mobile communication system includes a mobile terminal device 300a installed in a movable mobile station (e.g., a car navigation terminal device mounted on a vehicle) and an in-fixed-station device 300b installed in a fixed station. Moreover, the mobile terminal device 300a includes positional information acquiring means 301, directional information acquiring means 302, image input means 303, and information transmitting means 304. Furthermore, the in-fixed-station device 300b includes information receiving means 305, a map database 306, and character string recognizing means 307.

Description will be given of a function of the mobile terminal device 300a. The image input means 303 is realized by a mobile video camera or the like. The means 303 outputs scene image data to the information transmitting means 304.

The positional information acquiring means 301 is realized by a GPS receiver or the like. The means 301 measures a position of the image input means 303 when the scene is shot to thereby obtain latitude/longitude (positional information). Then the means 301 delivers the obtained positional information to, the information transmitting means 304.

The directional information acquiring means 302 is implemented by a gyroscope or the like. The means 302 detects a direction (east, west, south, north) of the image input means 303 when the scene is shot to thereby obtain directional information. Then the means 302 outputs the obtained directional information to the information transmitting means 304.

The information transmitting means 304 is realized by a computer (not shown) operating according to an information receiving program, which will be described later, a network interface module (not shown) of the mobile terminal device 300a, and the like. In this regard, the information receiving program is stored in a storage device (not shown) of the device 300a. The information transmitting means 304 transmits information (positional information, directional information, and image data) inputted from the positional information acquiring means 301, the directional information acquiring means 302, and the image input means 303 via a wireless communication network to the information receiving means 305 of the in-fixed-station device 300b.

In the embodiment, the storage device of the mobile terminal device 300a has stored various programs to communicate information with the in-fixed-station device 300b. For example, the storage device of the device 300a has stored therein an information communication program to make a computer execute processing for transmitting shooting position information indicating a shooting position of an image, shooting direction information indicating a shooting direction of an image, and an image thus shot via a wireless transmission network to the fixed station device and processing for receiving from the fixed station device information of a character or a character string obtained by the fixed station device through the character recognition processing for the image using the shooting position information and the shooting direction information.

Next, description will be given of a function of the in-fixed-station device (fixed station device) 300b. The information receiving means 305 is realized by a computer (not shown) operating according to a character recognition program, a network interface module (not shown) of the in-fixed-station device 300b, and the like. In this regard, the character recognition program is stored in a storage device (not shown) of the device 300b. The information transmitting means 304 receives, via a wireless communication network, information (positional information, directional information, and image data) transmitted from the information transmitting means 304. And the information receiving means 305 delivers the received information to the character string recognizing means 307.

The map database 306 is implemented by a storage device such as a magnetic disk device (not shown). The map database 306 stores therein transportation network information indicating positions of transportation networks, place name information indicating place names and existing ranges of regions, building information indicating building names, building structures, and building locations, and store information indicating store names, store telephone numbers, and store addresses.

The character string recognizing means 307 is realized by a computer (not shown) or the like operating according to a character recognition program. The means 307 extracts from the map database 306 word knowledge possibly included in a scene image, according to the positional information and the directional information received by the information receiving means 305. Then the means 307 reads, using the extracted word knowledge, character information existing in the scene image inputted from the information receiving means 305 to thereby conduct character recognition.

In the embodiment, the storage device of the fixed station device 300b has stored various programs to conduct character recognition. For example, the storage device of the device 300b stores therein a character recognition program to cause a computer to execute processing for receiving from the mobile terminal device the image shot by the mobile terminal device, the shooting position information indicating a shooting position of the image, and the shooting direction information indicating a shooting direction of the image; processing for determining, according to the shooting position information and the shooting direction information that are received from the mobile terminal device, a range of an object shot by the mobile terminal device; processing for extracting, from position corresponding information storage means storing therein position corresponding information that is words associated with respective positional information indicating positions of respective places, position corresponding information associated with positions included in the range; processing for recognizing a character or a character string included in the image received from the mobile terminal device, using the extracted position corresponding information; and processing for transmitting information of a character or a character string thus recognized via a communication network to the mobile terminal device.

Moreover, in the embodiment, the imaging means is realized by the image input means 303. The position measuring means is realized by the positional information acquiring means 301. The direction detecting means is realized by the directional information acquiring means 302. Information transmitting means on mobile terminal side is realized by the information transmitting means 304. Position corresponding information storage means is realized by the map database 306. Position corresponding information extracting means and character recognizing means are realized by the character string recognizing means 307. Information transmitting means on mobile station side is realized by a computer and a network interface module of the in-fixed-station device 300*b*. Information receiving means on mobile station side is realized by a computer and a network interface module of the mobile terminal device 300*a*. Output means is realized by a computer, a display module (not shown), and a voice and sound output module (not shown) of the mobile terminal device.

Next, the operation will be described. FIG. 13 is a flowchart showing an example of the information acquiring processing where the mobile terminal device 300*a* acquires the positional information, the directional information, and the scene image data. Moreover, FIG. 14 is a flowchart showing an example of the information recognition processing executed by the in-fixed-station device 300*b*.

First, description will be given of operation of the mobile terminal device 300*a*. The image input means 303 shoots a scene to output image data (step S31). The positional information acquiring means 301 measures the position of the image input means 303 to thereby acquire positional information (step S32). The directional information acquiring means 302 detects the direction of the image input means 303 to thereby acquire directional information (step S33). The information transmitting means 304 transmits the image data, the positional information, and the directional information from the image input means 303, the positional information acquiring means 301, and the directional information acquiring means 302 via a wireless communication network to the in-fixed-station device 300*b* (step S34).

When the in-fixed-station device 300*b* executes the character recognition processing, which will be described later, and transmits result information of the character recognition, the mobile terminal device 300*a* receives the result information of the character recognition via the wireless communication network from the in-fixed-station device 300*b* (step S35). And the result information of the character recognition is used by the user of the mobile station or the like, on the side of the mobile terminal device 300*a*. For example, the device 300*a* displays the received result information of the character recognition on a display module to thereby supply the information to the user. Also, for example, the device 300*a* may deliver the received character recognition result information to a sound and voice output module to thereby supply the information to the user.

When the character recognition result information is received, the mobile terminal device 300*a* determines whether an indication of the processing end is inputted by a user or the like (step S36). If it is determined that the indication of termination of the processing is inputted, the device 300*a* terminates the information acquisition processing. If it is not determined that the indication of the processing end is inputted, the device 300*a* returns again to the processing of step S31 to repeatedly execute the processing from step S31 to step S36.

Next, description will be given of operation of the in-fixed-station device 300*b*. The information receiving means 305 receives, via a wireless communication network from the information transmitting means 304 of the mobile terminal device 300*a*, the scene image data, the positional information, and the directional information (step S41). The character string recognizing means 307 extracts from the map database 306, word knowledge possibly included in the scene image according to the received positional information and the received directional information. Then, the means 307 recognizes characters in the scene image using the extracted word knowledge (step S42).

When the character recognition is finished, the in-fixed-station device 300*b* transmits result information of the character recognition via the wireless communication network to the mobile terminal device 300*a* (step S43).

When the character recognition result information is transmitted, the in-fixed-station device 300*b* determines whether an indication of the processing end is inputted by a person-in-charge or the like of the fixed station (step S44). If it is determined that the indication of the processing end is inputted, the device 300*b* terminates the character recognition processing. If it is not determined that the indication of the processing end is inputted, the device 300*b* returns again to the processing of step S41 to repeatedly execute the processing from step S41 to step S44.

As above, according to the embodiment, since it is not necessary for the mobile terminal device 300*a* to include the map database and the character recognizing means, the configuration of the mobile terminal device can be simplified.

Incidentally, in the embodiment, the in-fixed-station device 300*b* may further include a document database. In this case, the character string recognizing means 307 of the device 300*b* may extract document information from the document database using as a retrieval key a word extracted from the map database 306. And the means 307 may conduct the character string recognition using the document information. Through the operation, the character recognition accuracy can be increased for character strings not directly related to the positional information.

Embodiment 4

Next, referring to drawings, description will be given of a fourth embodiment of the present invention. FIG. 15 is a block diagram showing an example of the configuration of a mobile communication system in which a mobile terminal device and an in-fixed-station device conduct communication via a wireless transmission path with each other. As shown in FIG. 15, the mobile communication system includes a mobile terminal device 400*a* installed in a movable mobile station (e.g., a car navigation terminal device mounted on a vehicle) and an in-fixed-station device 400*b* installed in a fixed station. Moreover, the device 400*a* includes positional information acquiring means 401, directional information acquiring means 402, image input means 403, positional and directional information transmitting means 404, document information receiving means 405, character string recognizing means 406, and a map database on mobile terminal side 407. Furthermore, the in-fixed-station device 400*b* includes positional and directional information receiving means 408, document database retrieving means 409, a map database on fixed station side 410, a map database 411, and document information transmitting means 412.

Description will be given of a function of the mobile terminal device 400*a*. The image input means 403 is realized by a mobile video camera or the like. The means 403 outputs scene image data to the character string recognizing means 406.

The positional information acquiring means 401 is realized by a GPS receiver or the like. The means 401 measures a position of the image input means 403 when a scene is shot to thereby obtain latitude/longitude (positional information). Then, the means 401 delivers the obtained positional information to the positional and directional information transmitting means 404.

The directional information acquiring means 402 is realized by a gyroscope or the like. The means 402 detects a direction (east, west, south, north) of the image input means 403 when the scene is shot to thereby obtain directional information. Then, the means 402 outputs the obtained directional information to the positional and directional information transmitting means 404.

The positional and directional information transmitting means 404 is realized by a computer (not shown) operating according to a character recognition program, a network interface module (not shown) of the mobile terminal device 400*a*, and the like. In this regard, the character recognition program is stored in a storage device (not shown) of the device 400*a*. The positional and directional information transmitting means 404 transmits information (positional information and directional information) inputted from the positional information acquiring means 401 and the directional information acquiring means 402 via a wireless communication network to the positional and directional information receiving means 408 of the in-fixed-station device 400*b*.

The document information receiving means 405 is realized by a computer operating according to a character recognition program, a network interface module of the mobile terminal device 400*a*, and the like. The means 405 receives document information via a wireless communication network from the in-fixed-station device 400*b* to output the information to the character string recognizing means 406.

The character string recognizing means 406 is realized by a computer operating according to a character recognition program. The character string recognizing means 204 conducts the character recognition processing using also the document information received from the in-fixed-station device 400*b* in addition to the word knowledge extracted from the map database on mobile terminal side 407.

In this connection, the function and the implementing method of the map database on mobile terminal side 407 are almost the same as the map database 203 shown in the second embodiment.

In the embodiment, the storage device of the mobile terminal device 400*a* has stored various programs to execute the character recognition processing. For example, the storage device of the device 400*a* stores therein a character recognition program to cause a computer to execute processing for transmitting shooting position information indicating a shooting position of an image and shooting direction information indicating a shooting direction of an image, via a communication network to the fixed station device; processing for receiving from the fixed station device non-corresponding-to-position information which is words not associated with respective positional information indicating positions of respective places and is determined by the fixed station device using the shooting position information and the shooting direction information; and processing for recognizing a character or a character string included in the image shot by the mobile terminal device, using the non-corresponding-to-position information received from the fixed station device.

Next, description will be given of a function of the in-fixed-station device (fixed station device) 400*b*. The positional and directional information receiving means 408 is implemented by a computer (not shown) operating according to an information extraction program, which will be described later, a network interface module (not shown) of the in-fixed-station device 400*b*, and the like. In this regard, the information extraction program is stored in a storage device (not shown) of the device 400*b*. The positional and directional information receiving means 408 receives, via a wireless communication network, information (positional information and directional information) transmitted from the positional and directional information transmitting means 404. And the positional and directional information receiving means 408 delivers the received information to a document database retrieving means 409.

The functions and the implementing methods of the map database on fixed station side 410 and the document database 411 are respectively almost the same as for the map database 203 and the document database 205 shown in the second embodiment.

The document database retrieving means 409 is realized by a computer (not shown) or the like operating according to an information extraction program. The means 409 makes retrieval through the map database on fixed station side 410 according to the positional information and the directional information received by the positional and directional information receiving means 408, and extracts word knowledge from the database 410. Also, the means 409 makes retrieval through the document database 411 using the extracted word knowledge as a retrieval key to extract a related document. Then the means 409 outputs the extracted document information to the document information transmitting means 412.

In the embodiment, the storage device of the fixed station device 400*b* has stored various programs to conduct the information extraction processing. For example, the storage device of the device 400*b* stores therein an information extraction program to cause a computer to execute processing for receiving from the mobile station device shooting position information indicating a shooting position of an image shot by the mobile station device and shooting direction information indicating a shooting direction of the image; processing for determining, according to the shooting position information and the shooting direction information that are received from the mobile station device, a range of an object shot by the mobile station device; processing for extracting, from position corresponding information storage means on fixed station side storing therein position corresponding information that is words associated with respective positional information indicating positions of respective places, position corresponding information associated with positions included in the range; processing for extracting, from non-corresponding-to-position information storage means storing therein non-corresponding-to-position information that is words not associated with positional information, non-corresponding-to-position information according to the position corresponding information extracted from the position corresponding information storage means on fixed station side; and processing for transmitting the extracted non-corresponding-to-position information via a communication network to the mobile station device.

Moreover, in the embodiment, the imaging means is realized by the image input means 403. The position measuring means is realized by the positional information acquiring means 401. The direction detecting means is realized by the directional information acquiring means 402. Mobile terminal side information transmitting means is realized by the positional and directional information transmitting means 404. Character recognizing means and position corresponding information extracting means on mobile terminal side are realized by the character-string recognizing means 406. Position corresponding storage means on fixed station side is realized by the map database on fixed station side 410. Position corresponding information extracting means on fixed station side and non-corresponding-to-position information extracting means are realized by the document retrieving means 409. Non-corresponding-to-position information storage means is realized by the document database 411. Information transmitting means on fixed station side is realized by the document information transmitting means 412. Position corresponding information storage means on mobile station side is realized by the map database on mobile station side 407.

Next, the operation will be described. FIG. 16 is a flowchart showing an example of the processing progress of the character recognition processing conducted by the mobile terminal device 400*a*. Moreover, FIG. 17 is a flowchart showing an example of the processing progress of the document information extraction processing executed by the in-fixed-station device 400*b* to extract document information.

First, description will be given of operation of the mobile terminal device 400*a*. The positional information acquiring means 401 measures the position of the image input means 403 to thereby acquire positional information (step S52). The directional information acquiring means 402 detects the direction of the image input means 403 to thereby acquire directional information (step S53). The positional and directional information transmitting means 404 transmits the positional information and the directional information from the positional information acquiring means 401 and the directional information acquiring means 402 via a wireless communication network to the in-fixed-station device 400*b* (step S54).

When the in-fixed-station device 400*b* executes the document information extraction processing, which will be described later, and transmits document information, the document information receiving means 405 receives the document information via the wireless communication network from the in-fixed-station device 400*b* (step S55).

In this regard, after having transmitted the positional information and the directional information in step S54, the mobile terminal device 400*a* enters a wait state and stays therein without executing processing of the next step S56 until document information is received from the in-fixed-station device 400*b*. In this situation, it may also be possible that the mobile terminal device 400*a* executes, while awaiting processing, in advance processing executable without using the document information from the in-fixed-station device 400*b*. For example, even before the document information is received, the device 400*a* may conduct character recognition by assuming a range of one character in the background image in various ways.

When the document information is received, the character string recognizing means 406 recognizes a character string in the image data from the image input means 403 by use of the word knowledge extracted from the map database on mobile terminal side 407 based on the positional information and the directional information and the document information received from the in-fixed-station device 400*b* (step S56). In this connection, the method of extracting word knowledge such as a building name and a store name from the map database on mobile terminal side 407 according to the positional information and the directional information is similar to that shown in the first embodiment.

When the character recognition is finished, the mobile station device 400*a* determines whether an indication of the processing end is inputted by a user or the like (step S57). If it is determined that the indication of the processing end is inputted, the device 400*a* terminates the character recognition processing. If it is not determined that the indication of the processing end is inputted, the device 400*a* returns again to the processing of step S51 to repeatedly execute the processing from step S51 to step S57.

The character recognition result information is used by the user or the like of a mobile station on the side of the mobile terminal device 400*a*. For example, device 400*a* may display the result information on a display module (not shown) to thereby supply the information to the user. Moreover, for example, the device 400*a* may output the result information to a voice and sound output module (not shown) or the like to thereby supply the information to the user.

Next, description will be given of operation of the in-fixed-station device. 400*b*. The positional and directional information receiving means 408 receives, via the wireless communication network, the positional information and the directional information sent from the positional and directional information transmitting means 404 of the mobile terminal device 400*a* in step S54 (step S61). Then the means 408 outputs the received positional and directional information to the document database retrieving means 409.

The document database retrieving means 409 refers to the map database on fixed station side 410 according to the received positional and directional information to extract word knowledge from the database 410. The means 409 makes retrieval through the document database 411 using the extracted word knowledge as a retrieval key to extract related document information from the document database 411 (step S62). Then, the means 409 outputs the extracted document information to the document information transmitting means 412.

The document information transmitting means 412 transmits the document information via a wireless communication network to the mobile terminal device 400*a* (step S63). After the document is transmitted, the in-fixed-station device 400*b* determines whether an indication of the processing end is inputted by a person-in-charge or the like of the fixed station (step S64). If it is determined that the indication of the processing end is inputted, the device 400*b* terminates the character recognition processing. If it is not determined that the indication of the processing end is inputted, the device 400*b* returns again to the processing of step S61 to repeatedly execute the processing from step S61 to step S64.

As above, according to the embodiment, the in-fixed-station device 400*b* includes the document database 411 to execute the retrieval processing of the document information on the side of the device 400*b*. The document database retrieval time considerably varies according to the size of the document database. Also, the document database retrieval processing takes a long processing time in comparison with other processing. According to the embodiment, since the document database retrieval processing is conducted in the fixed station, the processing load of the mobile terminal device 400*a* is mitigated, and in comparison with the second embodiment, the computation performance required for the mobile terminal device 400*a* is equal to or less than that of the second embodiment. Moreover, since the document database is controlled on the fixed station side in a unified manner, the maintenance is facilitated and maintainability can be improved.

Incidentally, when the in-fixed-station device 400b sends information to the mobile terminal device 400a, there may also be considered a configuration in which the word knowledge extracted from the map database on fixed station side 410 is also transmitted together with the character information. In the embodiment, the transmission is conducted limitatively for the document information, and hence the data volume transmitted from the in-fixed-station device 400b to the mobile terminal device 400a can be reduced.

Furthermore, in the embodiment, description has been given of a case in which the in-fixed-station device 400b transmits only document information. However, device 400b may also transmit, in addition to the document information, the word knowledge extracted from the map database on fixed station side 410 to the mobile terminal device 400a. In this situation, it is also possible for the device 400a not to include the map database on mobile terminal side 407 and conducts the character recognition using only the information received from the in-fixed-station device 400b. Through the operation, the processing load of the mobile terminal device 400a can be further mitigated in comparison with the case where only the document information is transmitted, and hence high computation performance is not required for the device 400a.

INDUSTRIAL APPLICABILITY

The character recognition device in accordance with the present invention is applicable to a system including terminal devices such as a car navigation terminal device mounted on a vehicle and a portable telephone. For example, when the device is applied to a system including a car navigation device or the like, a message that a signboard indicating a destination has been detected can be notified to the driver. Also, when a route to the destination is guided to the driver, road guide information can be supplied by indication of a road guide sign or the like. Additionally, peripheral information matching the taste of a driver or the like can be provided to the driver while a car is moving. For example, using a character recognition result from the character recognition device, it is possible to provide the driver with information such as "a signboard of a target noodle shop is seen", "turn to the left at an intersection where the next guide sign is standing (toward Ginza)", and "exhibition of your favorite painter is being held in a department store ahead on the right".

BRIEF DESCRIPTION OF DRAWINGS

FIG. 3 is an explanatory diagram showing an example of the particular range determined by the character recognition device.

FIG. 4 is an explanatory diagram showing an example of the transportation network information regarding roads.

FIG. 10 is a flowchart showing another example of the character recognition processing executed by the character recognition device.

FIG. 15 is a block diagram showing another example of the configuration of a mobile communication system in which a mobile terminal device and an in-fixed-office device communicate via a wireless transmission path with each other.

FIG. 16 is a flowchart showing an example of the character recognition processing executed by the mobile terminal device 400a.

DESCRIPTION OF REFERENCE NUMERALS

Figure 1:
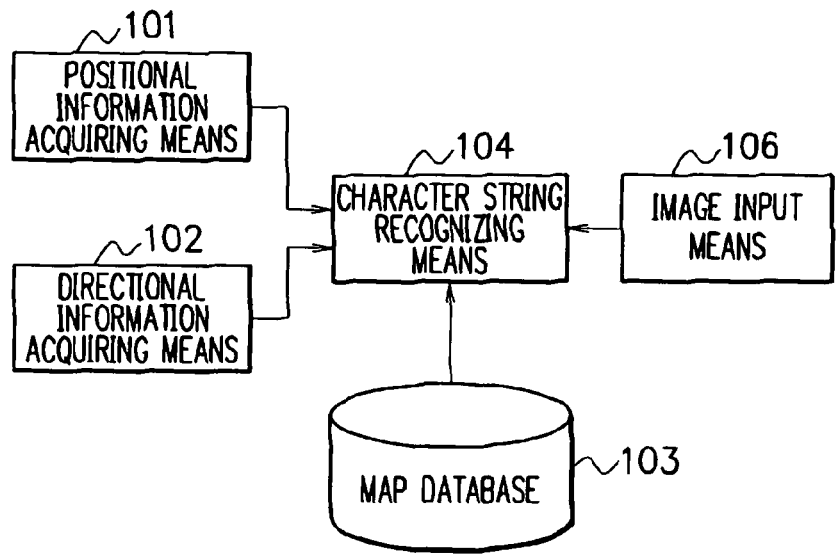
FIG. 1 is a block diagram showing an example of the configuration of a character recognition device in accordance with the present invention.
Figure 2:
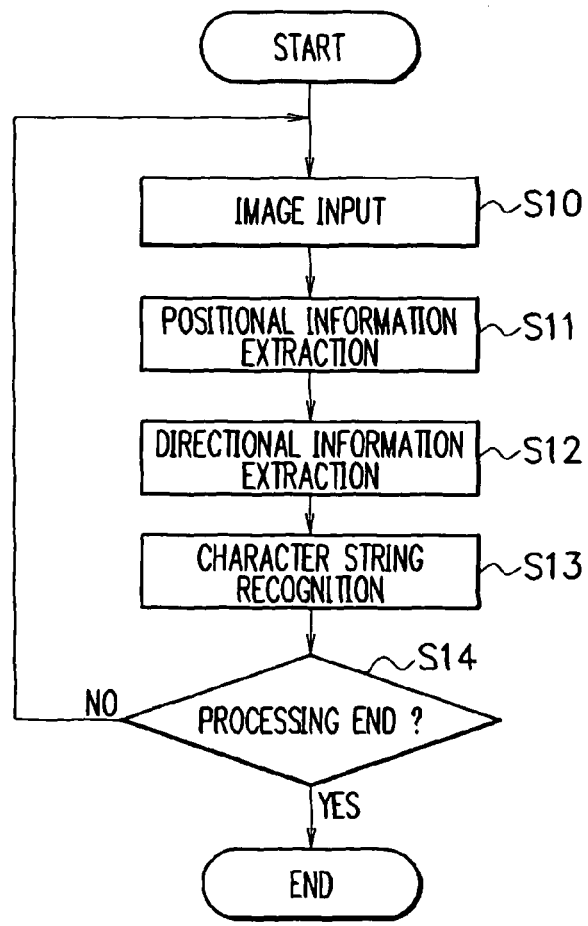
FIG. 2 is a flowchart showing an example of the character recognition processing executed by the character recognition device.
Figures 5, 6, 7:
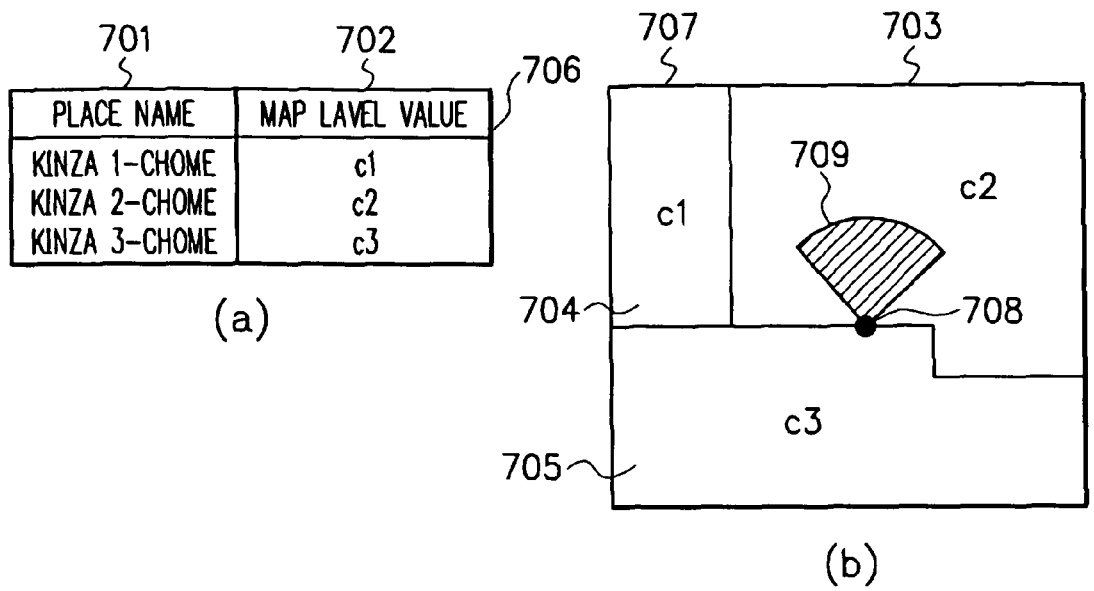
FIG. 5 is an explanatory diagram showing an example of the place name information.
FIG. 6 is an explanatory diagram showing an example of the building information.
FIG. 7 is an explanatory diagram showing an example of the store information.
Figure 8:
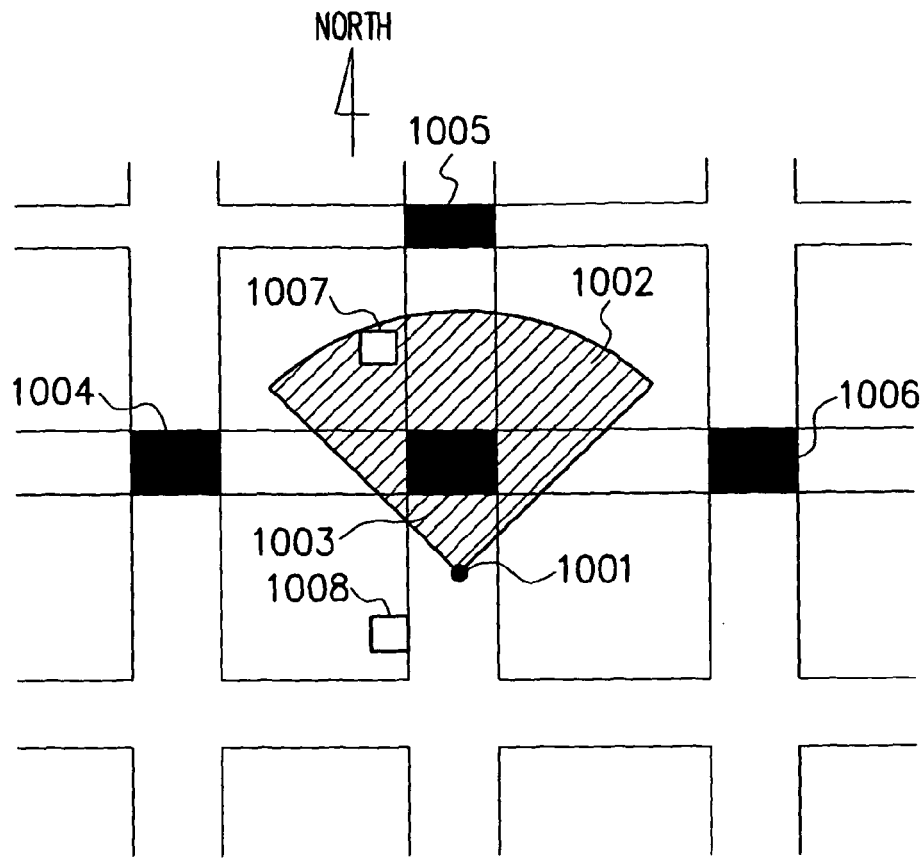
FIG. 8 is an explanatory diagram in which the current position, the current direction, and the shooting range of the character recognition device at a certain point of time are displayed in an overlapping way on a map.
Figure 9:
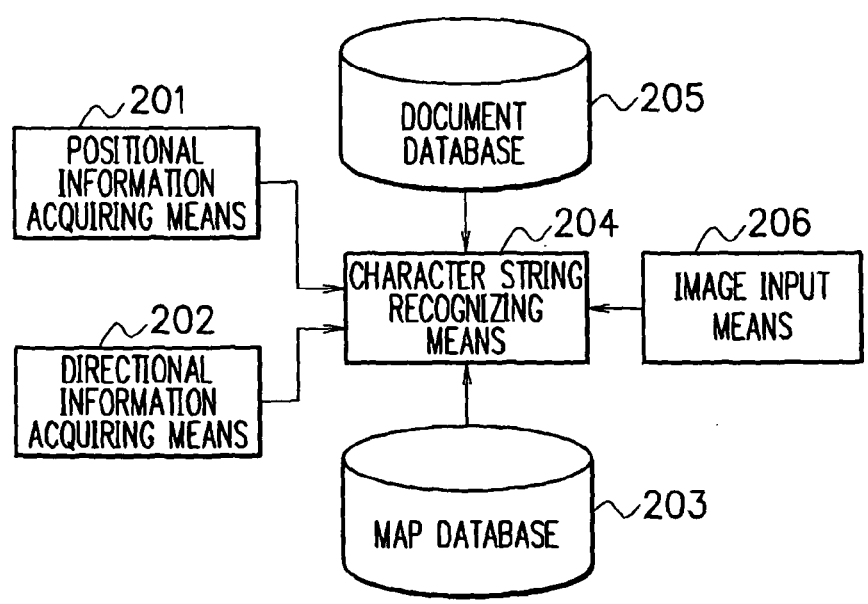
FIG. 9 is a block diagram showing another example of the configuration of the character recognition device.
Figure 11:
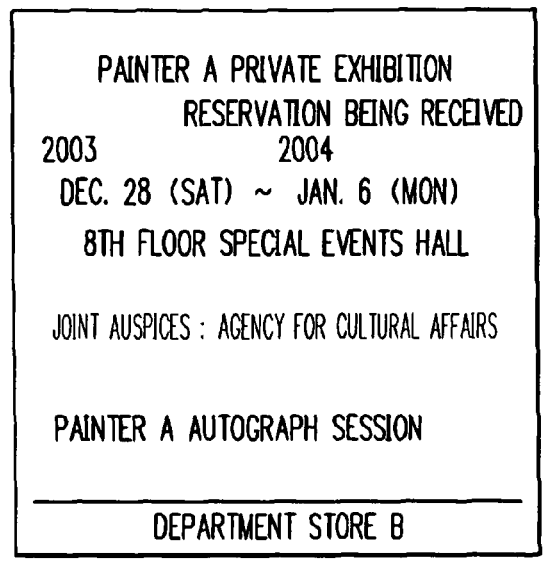
FIG. 11 is an explanatory diagram showing an example of a hanging screen of a department store shot by a vehicle mounted camera of a vehicle.
Figure 12:
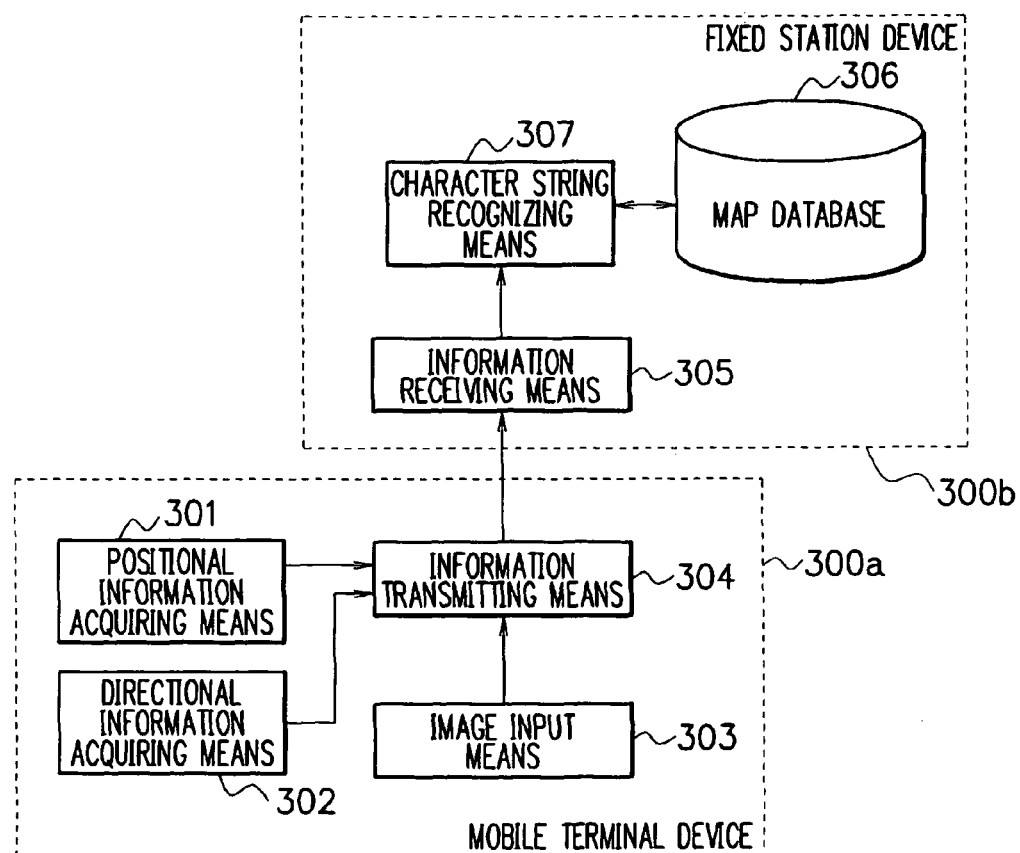
FIG. 12 is a block diagram showing an example of the configuration of a mobile communication system in which a mobile terminal device and an in-fixed-office device communicate via a wireless transmission path with each other.
Figure 13:
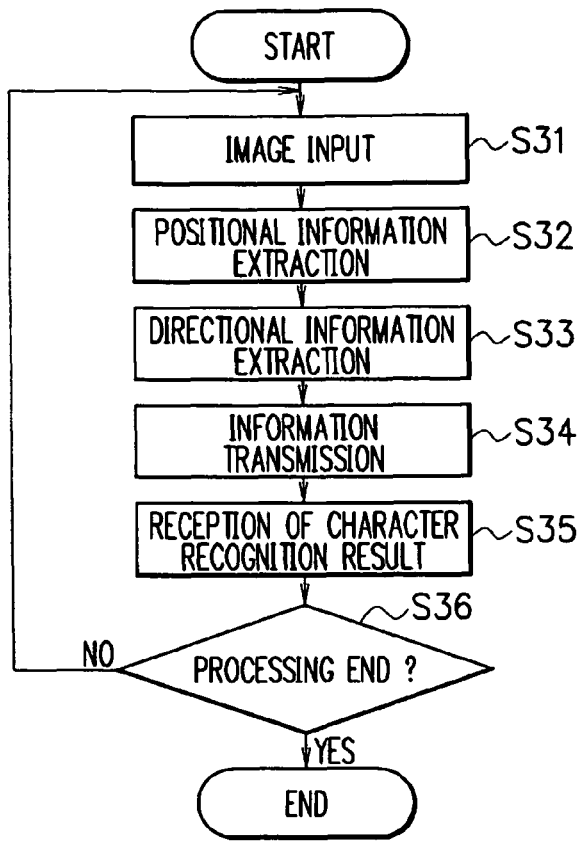
FIG. 13 is a flowchart showing an example of the information acquisition processing for the mobile terminal device 300a to acquire positional information, directional information, and scene image data.
Figure 14:
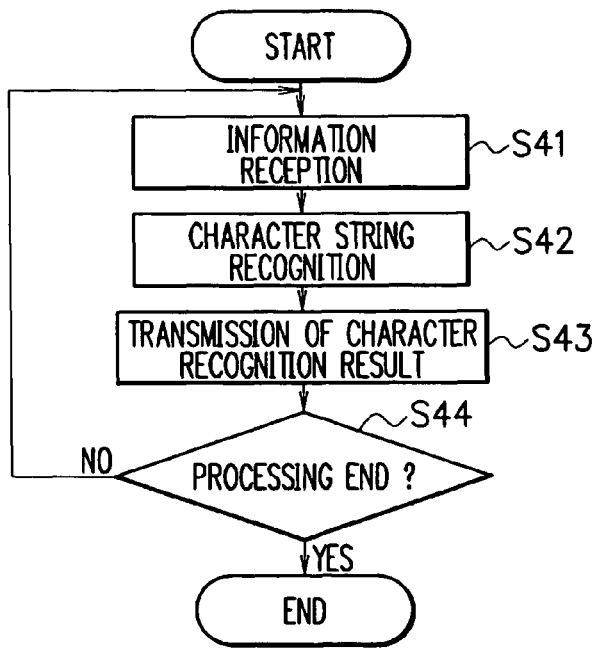
FIG. 14 is a flowchart showing an example of the character recognition processing which the in-fixed-station device 300a executes.
Figure 16:
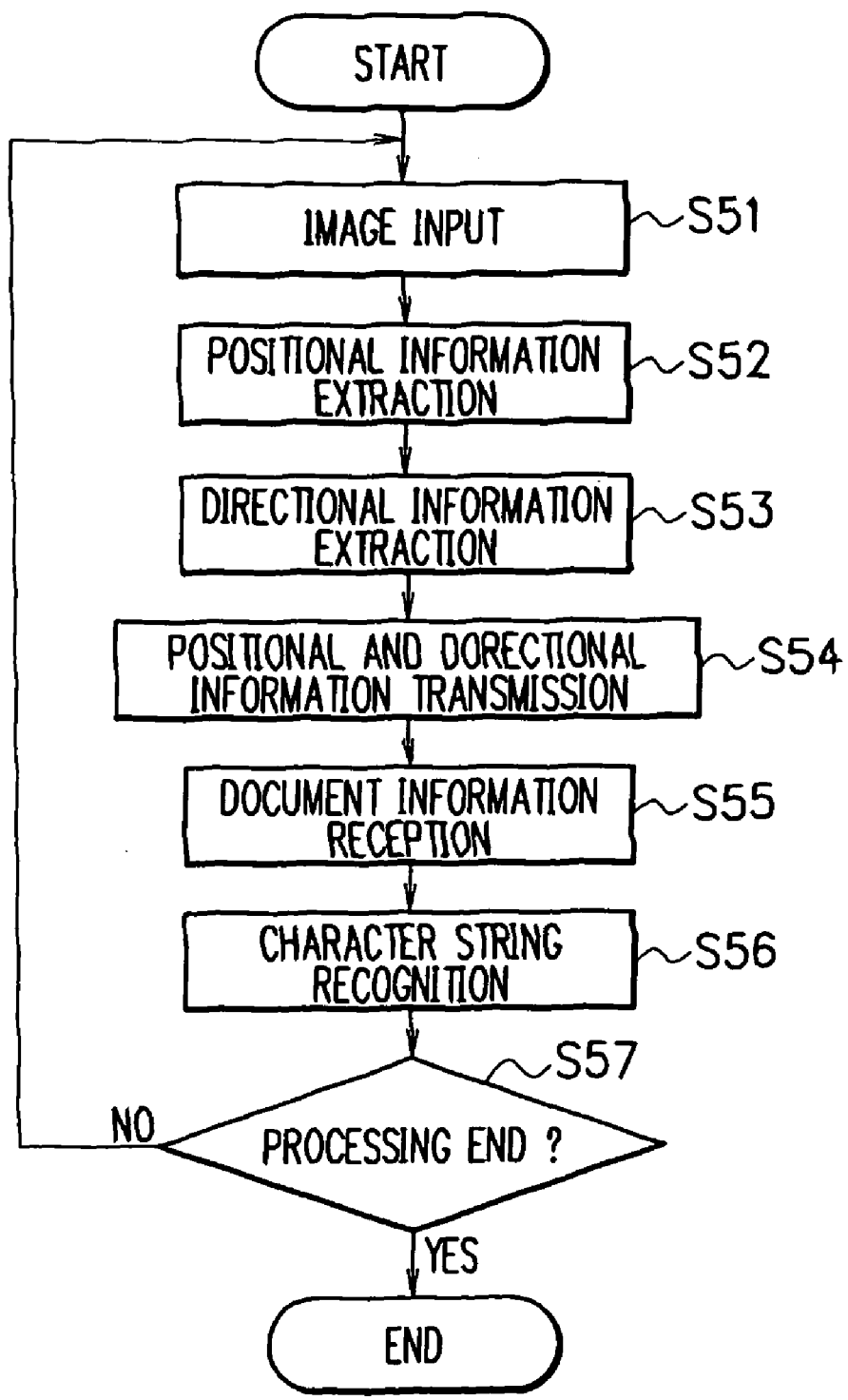
Figure 17:
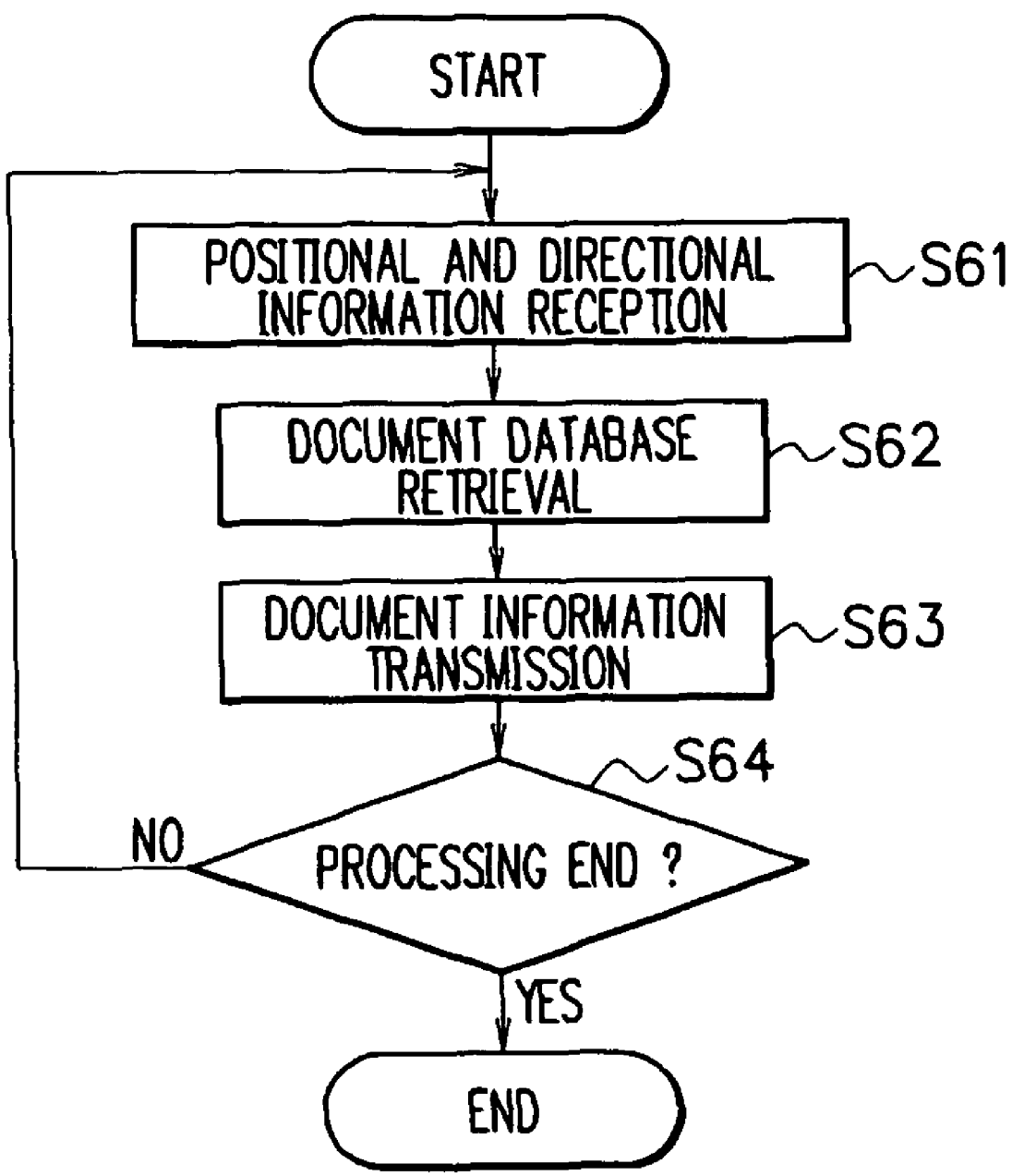
FIG. 17 is a flowchart showing an example of the document information extraction processing executed by the in-fixed-station device 400b to extract document information.

101 Positional information acquiring means
102 Directional information acquiring means
103 Map database
104 Character string recognizing means
106 Image input means

The invention claimed is:
1. A character recognition device, comprising:
imaging means for shooting an image;
position measuring means for measuring a shooting position of the image to obtain shooting position information indicating the shooting position;
direction detecting means for detecting a shooting direction of the image in order to obtain shooting direction information indicating the shooting direction;
position corresponding information storage means for storing position corresponding information that is words associated with respective positional information indicating positions of respective places;
position corresponding information extracting means for determining, based on the shooting position information and the shooting direction information, a range of a shooting object by the imaging means, and extracting from the position corresponding information storage means position corresponding information associated with positions included in the range; and
character recognizing means for recognizing, using the position corresponding information extracted by the position corresponding information extracting means, a character or a character string included in the image shot by the imaging means.

2. The character recognition device in accordance with claim 1, comprising:
- non-corresponding-to-position information storage means for storing therein non-corresponding-to-position information that is words not associated with positional information; and
- non-corresponding-to-position information extracting means for extracting non-corresponding-to-position information from the non-corresponding-to-position information storage means according to the position corresponding information extracted by the position corresponding information extracting means, wherein
- the character recognizing means recognizes a character or a character string included in the image using the position corresponding information extracted by the position corresponding information extracting means and the non-corresponding-to-position information extracted by the non-corresponding-to-position information extracting means.

3. The character recognition device in accordance with claim 2, wherein:
- the non-corresponding-to-position information storage means stores therein, as non-corresponding-to-position information, a set of words that are not associated with the positional information and which includes at least one word equal to position corresponding information; and
- the non-corresponding-to-position information extracting means extracts non-corresponding-to-position information from the non-corresponding-to-position information storage means using as a key the position corresponding information extracted by the position corresponding information extracting means.

4. A character recognition method, comprising:
- shooting an image using imaging means;
- measuring a shooting position of the image to obtain shooting position information indicating the shooting position;
- detecting a shooting direction of the image in order to obtain shooting direction information indicating the shooting direction;
- determining, based on the shooting position information and the shooting direction information, a range of a shooting object of the imaging means,
- extracting, from a position corresponding information storage means storing position corresponding information including words associated with respective positional information indicating positions of respective places, position corresponding information associated with positions included in the range; and
- recognizing, using the extracted position corresponding information, a character or a character string included in the image shot by the imaging means.

5. The character recognition method in accordance with claim 4, further comprising:
- extracting, from non-corresponding-to-position information storage means storing therein non-corresponding-to-position information including words not associated with the positional information, non-corresponding-to-position information according to the extracted position corresponding information; and
- recognizing a character or a character string included in the image using the extracted position corresponding information and the extracted non-corresponding-to-position information extracted.

* * * * *